US008846835B2

(12) United States Patent
Ker et al.

(10) Patent No.: US 8,846,835 B2
(45) Date of Patent: Sep. 30, 2014

(54) ADJUSTING POLYMER COMPOSITION

(71) Applicant: NOVA Chemicals (International) S.A., Fribourg (CH)

(72) Inventors: Victoria Ker, Calgary (CA); Peter Phung Minh Hoang, Calgary (CA); Yan Jiang, Calgary (CA); Yves Lacombe, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 57 days.

(21) Appl. No.: 13/631,033

(22) Filed: Sep. 28, 2012

(65) Prior Publication Data
US 2014/0024789 A1    Jan. 23, 2014

(30) Foreign Application Priority Data
Jul. 23, 2012  (CA) .................................. 2783494

(51) Int. Cl.
*C08F 4/646*   (2006.01)
*C08F 4/642*   (2006.01)
*C08F 4/6592*  (2006.01)
*C08F 4/69*    (2006.01)
*C08L 23/08*   (2006.01)
*C08F 210/16*  (2006.01)
*C08F 4/659*   (2006.01)

(52) U.S. Cl.
CPC ........... *C08F 210/16* (2013.01); *C08F 4/65922* (2013.01); *C08F 4/65912* (2013.01); *C08F 4/65916* (2013.01); *Y10S 526/943* (2013.01)
USPC ........... 526/113; 526/114; 526/160; 526/161; 526/169; 526/348; 526/943

(58) Field of Classification Search
CPC ...... C08C 4/642; C08C 4/657; C08C 4/6576; C08C 4/6592; C08C 4/69; C08F 10/02; C08F 4/646; C08F 4/642; C08F 4/657; C08F 4/6576; C08F 4/6592; C08F 4/69; C08F 210/026; C08L 23/0815
USPC .......... 526/113, 114, 348, 943, 160, 161, 169
See application file for complete search history.

(56) References Cited

U.S. PATENT DOCUMENTS

| | | |
|---|---|---|
| 2,825,721 A | 3/1958 | Hogan et al. |
| 3,023,203 A | 2/1962 | Dye et al. |
| 3,622,521 A | 11/1971 | Hogan et al. |
| 3,704,287 A | 11/1972 | Johnson et al. |
| 4,011,382 A | 3/1977 | Levine et al. |
| 4,100,105 A | 7/1978 | Levine et al. |
| 4,543,399 A | 9/1985 | Jenkins, III |
| 4,588,790 A | 5/1986 | Jenkins, III |
| 4,701,432 A | 10/1987 | Welborn, Jr. |
| 4,808,561 A | 2/1989 | Welborn, Jr. |
| 4,935,397 A | 6/1990 | Chang |
| 4,937,301 A | 6/1990 | Chang |
| 5,028,670 A | 7/1991 | Chinh et al. |
| 5,034,364 A | 7/1991 | Kral et al. |
| 5,057,475 A | 10/1991 | Canich et al. |
| 5,064,802 A | 11/1991 | Stevens et al. |
| 5,096,867 A | 3/1992 | Canich et al. |
| 5,132,380 A | 7/1992 | Stevens et al. |
| 5,137,994 A | 8/1992 | Goode et al. |
| 5,292,845 A | 3/1994 | Kawasaki et al. |
| 5,324,800 A | 6/1994 | Welborn, Jr. |
| 5,352,749 A | 10/1994 | DeChellis et al. |
| 5,405,922 A | 4/1995 | DeChellis et al. |
| 5,434,116 A | 7/1995 | Sone et al. |
| 5,516,861 A | 5/1996 | Jejelowo |
| 5,525,678 A | 6/1996 | Mink et al. |
| 5,554,775 A | 9/1996 | Krishnamurti et al. |
| 5,633,394 A | 5/1997 | Welborn, Jr. |
| 5,637,659 A | 6/1997 | Krishnamurti et al. |
| 5,703,187 A | 12/1997 | Timmers |
| 5,723,399 A | 3/1998 | Takemoto et al. |
| 5,783,512 A | 7/1998 | Jacobsen et al. |
| 5,834,393 A | 11/1998 | Jacobsen et al. |
| 5,965,677 A | 10/1999 | Stephan et al. |
| 6,002,033 A | 12/1999 | Razavi et al. |
| 6,013,595 A | 1/2000 | Lhost et al. |
| 6,022,933 A | 2/2000 | Wright et al. |
| 6,034,021 A | 3/2000 | Wilson et al. |
| 6,087,293 A | 7/2000 | Carnahan et al. |
| 6,103,657 A | 8/2000 | Murray |
| 6,271,325 B1 | 8/2001 | McConville et al. |
| 6,274,684 B1 | 8/2001 | Loveday et al. |
| 6,300,438 B1 | 10/2001 | McConville |

(Continued)

FOREIGN PATENT DOCUMENTS

| | | |
|---|---|---|
| CA | 2616053 | 2/2007 |
| EP | 339571 | 11/1989 |
| EP | 640625 | 3/1995 |
| WO | WO 97/04015 | 2/1997 |
| WO | WO 00/02929 | 1/2000 |
| WO | WO 2005/121239 | 12/2005 |
| WO | WO 2009/067201 | 5/2009 |

OTHER PUBLICATIONS

Clark et al, Supported Catalysts, published online Nov. 15, 2002 in the Kirk-Othmer Encyclopedia of Chemical Technology pp. 1-37, Copyright © 2001, John Wiley & Sons, Inc.
J.C. Randall, A review of high resolution liquid 13acrbon nuclear magnetic resonance characerization of ethylene-based polymers, JMS vol. 29(2 & 3) pp. 201-317, 1989.
Broyer et al, Analysis of molecular weight distribution using multicomponent models, ACS Symposiun Series, vol. 197, pp. 45-64, 1982.
ASTM D1238-10, Stndard test method for melt flow rates of thermoplastics by extrusion plastometer, pp. 1-15, 2010.

(Continued)

*Primary Examiner* — Caixia Lu
(74) *Attorney, Agent, or Firm* — Kenneth H Johnson

(57) ABSTRACT

A scavenger is used to indirectly control the ratio of polymer components in a polyethylene composition made using a combination catalyst comprising an inorganic chromium catalyst, and a group 4 single site catalyst.

25 Claims, 2 Drawing Sheets

(56) References Cited

U.S. PATENT DOCUMENTS

| | | |
|---|---|---|
| 6,300,439 B1 | 10/2001 | McConville |
| 6,303,719 B1 | 10/2001 | Murray et al. |
| 6,309,997 B1 | 10/2001 | Fujita et al. |
| 6,320,002 B1 | 11/2001 | Murray et al. |
| 6,399,724 B1 | 6/2002 | Matsui et al. |
| 6,410,474 B1 | 6/2002 | Nowlin et al. |
| 6,417,304 B1 | 7/2002 | McConville et al. |
| 6,462,149 B1 | 10/2002 | Tilston et al. |
| 6,489,413 B1 | 12/2002 | Floyd et al. |
| 6,541,581 B1 | 4/2003 | Follestad et al. |
| 6,559,090 B1 | 5/2003 | Shih et al. |
| 6,583,083 B2 | 6/2003 | Murray et al. |
| 6,593,266 B1 | 7/2003 | Matsui et al. |
| 6,610,799 B1 | 8/2003 | Follestad et al. |
| 6,686,306 B2 | 2/2004 | Shih et al. |
| 6,689,847 B2 | 2/2004 | Mawson et al. |
| 6,734,131 B2 | 5/2004 | Shih et al. |
| 6,770,723 B2 | 8/2004 | Fujita et al. |
| 6,828,395 B1 | 12/2004 | Ehrman et al. |
| 6,958,375 B2 | 10/2005 | Shih et al. |
| 6,982,304 B2 | 1/2006 | Mure et al. |
| 6,995,219 B2 | 2/2006 | Follestad et al. |
| 8,148,470 B1 | 4/2012 | Holtcamp et al. |
| 2004/0242808 A1 | 12/2004 | Mink et al. |
| 2010/0125124 A1 | 5/2010 | Blackmon et al. |
| 2010/0190936 A1 | 7/2010 | Hoang et al. |
| 2010/0190937 A1 | 7/2010 | Hoang et al. |
| 2012/0041147 A1 | 2/2012 | Lacombe et al. |

OTHER PUBLICATIONS

ASTM D792-08, Standard test method for desnity and specific gravity of plastics by displacement, pp. 1-5, 2008.

ASTM D474-99, Stand. test method for deter. molecular weight distribution and molecular averages of polyolefins by high temp. gel permeation chromatography, pp. 1-6, 1999.

ASTM D6645-01, Standard test method for methyl content in polyethylene by infrared spectrophontomery, pp. 4, 2001.

ADJUSTING POLYMER COMPOSITION

FIELD OF THE INVENTION

The present invention is a process to control a polymer composition produced by a combination catalyst comprising an inorganic chromium catalyst and a group 4 single site catalyst.

BACKGROUND OF THE INVENTION

Methods to make polyethylene compositions comprising two (or more) polymer components, for example high and low molecular weight components, are well known in the art. These types of polymers can be useful for a huge range of applications which span from low density film, to high density pipe.

One method to make such compositions involves taking two different ethylene polymers, for example polymers which differ in molecular weight and/or comonomer content, and blending them in a post-reactor extrusion or melt blending process. Another well-known process involves using a polymerization catalyst in two sequentially arranged polymerization zones, where each zone provides distinct conditions, such as high and low concentrations of hydrogen, to form in situ, a blend of low and high molecular weight polymers respectively.

Multi-component blends can also be made in a single reactor by using at least two polymerization catalysts which provide divergent polymers under the same set of reactor conditions. Such multi component catalysts have taken many forms over the years and most typically involve mixed Ziegler-Natta catalysts, mixed Ziegler-Natta and single site catalysts (such as metallocene catalysts) or mixed single site catalysts.

Mixed catalysts consisting of a chromium catalyst and a so called "single site catalyst" have also been explored, but to a lesser extent. For example, E.P. Pat. No. 339, 571 discloses catalyst systems for use in the gas phase and which involve the combination of a chrome oxide catalyst and a metallocene catalyst. The catalyst components were supported on a silica support. Similarly, in U.S. Pat. No. 6,541,581, a chrome oxide catalyst is co-supported with a zirconocene catalyst on an inorganic oxide support.

In U.S. Pat. No. 5,723,399 a chromium catalyst, such as a silyl chromate catalyst, is combined with a metallocene or a constrained geometry catalyst in a single reactor. The catalyst components were co-supported on a silica support or alternatively, a metallocene or constrained geometry catalyst was added to a supported chromium catalyst in situ.

Catalysts comprising a silyl chromate catalyst and a group 4 single site catalyst which has at least one phosphinimine or ketimine ligand have been disclosed in U.S. Pat. Appl. Nos 20100190936A1 and 20100190937A1.

For multi component catalysts, the use of process control knobs such as hydrogen concentration to control melt index and other resin specifications can be a challenge and can lead to undesirable polymer compositions, since each catalyst component will typically have a different response to the parameter being changed. For example, a bimodal or multimodal polymer may become unimodal at different hydrogen concentrations due to the different hydrogen response of each catalyst component present. Mitigation of unintended fluctuations in polymerization conditions, such as temperature excursions or impurity levels is also a challenge with multi component catalysts, as each parameter change may have a differential impact on the performance of each catalyst species present. For systems in which distinct catalysts are fed separately to a polymerization zone, it is sometimes possible to control polymer characteristics (e.g. melt index, polydispersity, comonomer distribution, etc.) by changing the relative amounts of each catalyst present in the polymerization zone. However, multi component catalysts are often co-supported, especially for use in gas phase or slurry phase polymerization in order to make well mixed or homogeneous polymer compositions. For co-supported catalyst systems, the amount of polymer produced by each catalyst species is generally fixed by the initial ratio of catalyst components present on a support. It is therefore desirable to have methods which can attenuate product drift or to control polymer compositions made with a multi component catalyst, without having to reformulate the catalyst.

In-situ methods which alter polymer compositions made by a co-supported multi catalyst formulation have been explored. One manner in which the polymer compositions have been controlled has been to use a so called "make up catalyst". In U.S. Pat. No. 6,410,474, this involves the addition of a separate catalyst which is of same type as one catalyst species present in a multi catalyst system. This allows one to increase the amount of polymer made by one or the other of the catalyst species of the multi catalyst system. In this way, the ratio of polymer components can be altered in situ. The separate feeding of two multi component catalysts, each having a different ratio of catalyst species has also been used to control the polymer composition in situ, as is disclosed in U.S. Pat. Nos. 6,462,149 and 6,610,799. These methods suffer from the need for an additional catalyst delivery stream and can produce polymers having poor homogeneity, since the separate addition of a make-up catalyst will initiate growth of a separate polymer particle.

Another in-line method to control co-supported multi component catalysts, is to change the relative activities of each active species by the introduction of a catalyst poison. As described in U.S. Pat. No. 5,525,678, catalysts composed of a Ziegler-Natta and metallocene species can be controlled through the introduction of carbon dioxide or water. The presence of carbon dioxide and/or water was found to decrease the amount of a high molecular weight component made by the multi component catalyst.

Similarly, U.S. Pat. No. 6,828,395 teaches the use of "control agents" such alcohols, ethers, amines, or oxygen to alter the properties of a bimodal polymer made by a "bimetallic catalyst". To make the bimetallic catalyst, a Ziegler-Natta catalyst was co-supported with a metallocene catalyst.

In U.S. Pat. No. 6,995,219, a series of "adjuvants" were explored, for their ability to modify the relative activities of bridged and unbridged metallocenes which were used in a "multi-site" catalyst formulation. The adjuvants which were selected from the group consisting of phosphines, phosphites, acetylenes, dienes and acetyls, preferentially decreased the activity of the bridged metallocene, which had the effect of lowering the ratio of high to low molecular weight components produced during polymerization. In addition to modifying activity, the adjuvants also changed the molecular weight performance of each catalyst species. This is not always desirable, and it would be useful if the relative amounts, and the relative molecular weights of different polymer components could be controlled independently.

Canadian Pat. Appl. No. 2,616,053AA demonstrates the effect of adding water or carbon dioxide to a "hybrid" catalyst comprising a late transition metal catalyst and a metallocene catalyst. Water had the effect of reducing the relative activity of the late transition metal catalyst which made a low molecular weight component, while carbon dioxide reduced the relative activity of the metallocene catalyst responsible for making a high molecular weight component. In this way, water and carbon dioxide were used to increase and decrease the high to low molecular weight ratio respectively, of polymer components made in a single reactor.

U.S. Pat. Appl. No. 2004/0242808A1 teaches a method to control the molecular weight distribution of bimodal polymers made with bimetallic catalyst comprising a Ziegler-Natta catalyst and a metallocene catalyst. The method comprises changing the ratio of a cocatalytic organometallic component to a cocatalytic modified methylaluminoxane component.

U.S. Pat. No. 2010/0125124 describes a process employing a catalyst comprising a Ziegler-Natta catalyst and/or a metallocene catalyst component, as well as a cocatalyst. Adjusting the level of a catalyst component or the cocatalyst maintains a desired level of catalyst activity.

U.S. Pat. No. 5,516,861 discloses a polymerization process in which a supported bulky ligand metallocene and a separately supported cocatalyst are individually fed to a gas phase reactor. One exemplified supported cocatalyst is triethylaluminum supported on silica.

There remains a need for methods to control the performance of other mixed or multi component catalyst systems, especially systems which comprise a chromium catalyst in combination with a group 4 single site catalyst. It would be useful if such a method could alter the relative catalyst productivity while not substantially altering the molecular weight of the polymers produced by each catalyst.

U.S. Pat. Appl. No. 20120041147A1 describes the use of carbon dioxide to control the ratio of polymer components made with a combination catalyst comprising a chromium catalyst and a group 4 single site catalyst.

In U.S. Pat. No. 8,148,470, a so called "molecular switch" is employed to turn on the activity of an organochromium catalyst while simultaneously decreasing or "switching" off the activity of a group 4 or 5 transition metal catalyst where both catalysts are present in a polymerization reactor in co-supported form. The organochromium catalyst preferably has a chromium carbon bond or a chromium heteroatom bond, where the heteroatom is O, N, S, or P, preferably N, and where at least one heteroatom is further substituted by a substituted or unsubstituted aryl group. The use of inorganic chromium catalysts such as chromium oxide or silyl chromate is not taught. The molecular switch comprises oxygen and an alkylaluminum compound which are added to a reactor in sequence. The examples provided show that the molecular switch changes the polymer architecture in situ, from unimodal to bimodal with respect to molecular weight distribution profile. Since, the organochromium catalyst is relatively inactive before the in-situ addition of the molecular switch, only a single polymer component, that made by the group 4 or 5 transition metal catalyst, is initially present.

SUMMARY OF THE INVENTION

The present invention utilizes controlled amounts of scavenger together with impurities inherently present in a polymerization reactor in order to control the polymer architecture made by a combination catalyst.

The current invention allows for in-line polymer composition modification without the need to reformulate a combination catalyst recipe.

We have discovered that the presence of a scavenger has a divergent effect on the activity of inorganic chromium catalysts and group 4 single site catalysts, particularly group 4 single site catalysts having at least one phosphinimine ligand. We have found that by changing the level of scavenger present while polymerizing ethylene with a combination catalyst comprising an inorganic chromium catalyst and a group 4 single site catalyst, one can alter the ratio of polymer components made by each catalyst species.

Specifically, we have discovered that the addition of a scavenger compound increases the relative activity of a group 4 single site catalyst relative to an inorganic chromium catalyst when these catalysts are used simultaneously in an olefin polymerization process, where the process is carried out in the presence of a catalyst poison.

We have further discovered that a scavenger, especially a supported scavenger, has little effect on the molecular weight of polymers made by an inorganic chromium catalyst and a group 4 single site catalyst. Hence, the process of the current invention allows one to control the relative amounts of for example, high and low molecular weight components and/or high and low comonomer content components, made by a combination catalyst, without significantly affecting the relative molecular weights of the polymer components.

The present invention allows for control of a polymer composition, including the ability to maintain or reestablish on-spec resin properties in the presence of a potentially unknown and fluctuating level of catalyst poison present in a polymerization reactor, and which differentially affects the polymerization performance of catalytic components present in a combination catalyst.

We have further found that relatively high levels of scavenger can be used in the presence of a combination catalyst comprising an inorganic chromium catalyst and a single site catalyst by using the scavenger in supported form.

Provided is a process to co-polymerize ethylene and at least one co-monomer in the presence of at least one catalyst poison using a combination catalyst to provide a polymer composition comprising a first polymer component and a second polymer component wherein said process further comprises:
  adjusting (or controlling) the ratio of said first polymer component to said second polymer component by altering the amount of scavenger present;
  wherein said combination catalyst comprises:
    an inorganic chromium catalyst,
    a group 4 single site catalyst,
    one or more activators;
    and a support;
  wherein said inorganic chromium catalyst provides said first polymer component and said group 4 single site catalyst provides said second polymer component;
  wherein said catalyst poison reduces the polymerization activity of said group 4 single site catalyst relative to said inorganic chromium catalyst; and
  wherein lowering the level of scavenger in ppm (weight of the scavenger relative to the weight of polymer produced in parts per million) from a first higher level to a second lower level, increases said ratio of said first polymer component to said second polymer component, and raising the level of scavenger in ppm (weight the of scavenger relative to the weight of polymer produced in parts per million) from a first lower level to a second higher level, decreases said ratio of said first polymer component to said second polymer component.

Provided is a process to co-polymerize ethylene and at least one co-monomer in the presence of at least one catalyst poison using a combination catalyst to provide a polymer composition comprising a first polymer component and a second polymer component wherein said process comprises:
  adjusting (or controlling) the ratio of said first polymer component to said second polymer component by altering the amount of scavenger present;

wherein said combination catalyst comprises:
an inorganic chromium catalyst,
a group 4 single site catalyst,
one or more activators;
and a support;
wherein said inorganic chromium catalyst provides said first polymer component and said group 4 single site catalyst provides said second polymer component;
wherein said catalyst poison reduces the polymerization activity of said group 4 single site catalyst relative to said inorganic chromium catalyst; and
wherein decreasing the molar ratio of scavenger to catalyst poison, increases said ratio of said first polymer component to said second polymer component, and increasing the molar ratio of scavenger to catalyst poison decreases said ratio of said first polymer component to said second polymer component.

The present invention provides a continuous polymerization process in which increasing the level of scavenger in a polymerization zone, increases the relative amount of polymer made by a group 4 single site catalyst present in a combination catalyst also comprising an inorganic chromium catalyst, and one or more activators. Conversely, the present invention provides a continuous polymerization process in which decreasing the level of scavenger in a polymerization zone or reactor system, decreases the relative amount of polymer made by a group 4 single site catalyst present in a combination catalyst also comprising an inorganic chromium catalyst and one or more activators.

In an embodiment of the invention an inorganic chromium catalyst, a group 4 single site catalyst and at least one catalyst activator are co-supported on an inert support.

In an embodiment of the invention, the scavenger has the formula $Al(R^1)_n(R^2)_{3-n}$, where $R^1$ is a hydrocarbyl having from 1 to 20 carbon atoms; $R^2$ is independently selected from the group consisting of an alkoxide having from 1 to 20 carbon atoms, an aryloxide having from 6 to 20 carbon atoms, a halide, and a hydride; and n is a number from 1 to 3.

In an embodiment of the invention, the catalyst poison is oxygen.

In an embodiment of the invention, the scavenger is supported.

In an embodiment of the invention, the scavenger is supported on an inorganic oxide.

In an embodiment of the invention, the scavenger is a trialkylaluminum compound.

In an embodiment of the invention, the scavenger is triethylaluminum.

In an embodiment of the invention, the group 4 single site catalyst has at least one phosphinimine ligand.

In an embodiment of the invention, the group 4 single site catalyst has the formula: $L(Pl)MX_2$, where L is a cyclopentadienyl type ligand, Pl is a phosphinimine ligand, M is Ti, Zr or Hf, and each X independently, is an activatable ligand.

In an embodiment of the invention, the inorganic chromium catalyst is a silyl chromate catalyst.

In an embodiment of the invention, the inorganic chromium catalyst is a chromium oxide catalyst.

In an embodiment of the invention, the combination catalyst is a dual catalyst in which each catalyst component is supported on the same batch of support particles.

In an embodiment of the invention, the dual catalyst is supported on an inorganic oxide.

In an embodiment of the invention, the comonomer is selected from the group consisting of 1-butene, 1-hexene and 1-octene.

In an embodiment of the invention, the process is a gas phase process.

In an embodiment of the invention, a first polymer component has a lower comonomer content than a second polymer component.

In an embodiment of the invention, a first polymer component has a lower weight average molecular weight than a second polymer component.

In an embodiment of the invention, a polymer composition has a bimodal composition when analyzed by gel permeation chromatography.

In an embodiment of the invention, a first polymer component represents from 95 to 25 wt % of a polymer composition and a second polymer component represents from 5 to 75 wt % of a polymer composition.

In an embodiment of the invention, a first polymer component represents from 99 to 80 wt % of a polymer composition and a second polymer component represents from 1 to 20 wt % of a polymer composition.

In an embodiment of the invention, a polymer composition has a bimodal composition when analyzed by gel permeation chromatography and a first polymer component has a lower weight average molecular weight than a second polymer component.

In an embodiment of the invention, a polymer composition has a bimodal composition when analyzed by gel permeation chromatography; and a first polymer component has a lower weight average molecular weight than a second polymer component; and a first polymer component has a lower comonomer content than a second polymer component.

In an embodiment of the invention, a first polymer component is made by an inorganic chromium catalyst and a second polymer component is made by a group 4 single site catalyst.

In an embodiment of the invention, the process further comprises changing the level of carbon dioxide present in a reactor.

The present invention also includes embodiments comprising one or more of the embodiments provided above in one or more suitable combination.

DETAILED DESCRIPTION

Figure 1:
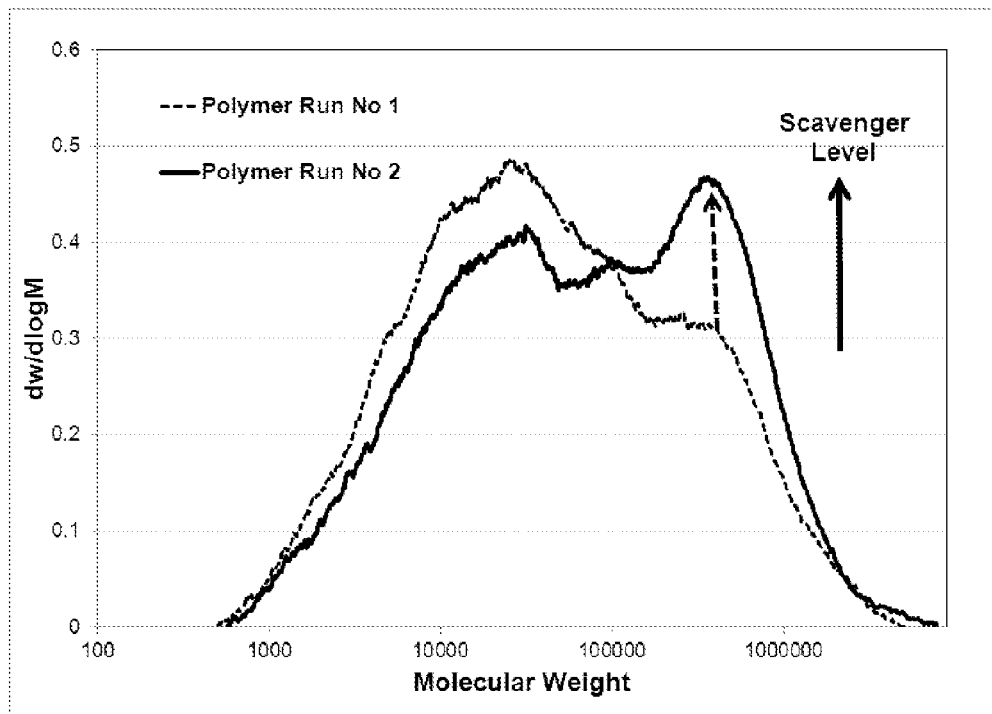
FIG. 1 shows how the polymer composition molecular weight distribution profile (from GPC) is affected by changes in the amount of scavenger present in a reactor for embodiments of the current invention.

The present invention, in an embodiment, utilizes scavenger levels in the presence of impurities inherently present in a polymerization reactor in order to control the polymer architecture made by a combination catalyst. Polymer compositions are produced by co-polymerizing ethylene with one or more alpha-olefins using the combination catalyst.

In the current invention, the term "catalyst" denotes a compound which is active for ethylene homopolymerization or copolymerization of ethylene with alpha-olefins.

In the present invention, the term "combination catalyst" connotes a catalyst system which contains at least two different catalysts. In the present invention, the different catalysts can be independently un-supported or supported, but are preferably supported on one or more supports. Supported combination catalysts include dual catalysts and mixed catalysts. A combination catalyst preferably includes one or more catalyst activators and/or cocatalysts.

In the current invention, the term "dual catalyst" refers to a combination catalyst in which a minimum of two different catalysts are supported on the same batch of support particles. Hence for a dual catalyst, each polymerization catalyst will be co-immobilized on a support particle of a particular composition. For an example of a dual catalyst comprising a chromium catalyst and single site group 4 catalyst comprising a phosphinimine ligand see U.S. Pat. Appl. No. 20100190937A1.

In the current invention, the term "mixed catalyst" refers to a combination catalyst in which at least two different polymerization catalysts have been independently supported on different batches of support particles. Hence, for a mixed catalyst, each of at least two polymerization catalysts will be independently immobilized on a different support particle which may be of the same or different composition. For an example of a mixed catalyst comprising a chromium catalyst and single site group 4 catalyst comprising a phosphinimine ligand see U.S. Pat. Appl. No. 20100190936A1.

In the present invention the term "group 4" means group 4 transition metal. Group 4 transition metals include Ti, Zr and Hf.

Preferably, the combination catalyst used in the current invention comprises an inorganic chromium catalyst, a group 4 single site catalyst, one or more activators and at least one support. Any combination of an inorganic chromium and group 4 single site catalysts is contemplated by the current invention, provided that the relative activity (and productivity) of the inorganic chromium catalyst and the group 4 single site catalyst is sensitive to the presence of a scavenger. This will generally be the case where the polymerization reaction takes place in a reactor having some amount of impurity or catalyst poison present.

Without wishing to be bound by theory, the scavenger works indirectly by reacting with and changing the amount of one or more adventitious catalyst poison or impurity present in a polymerization reactor. For example, the scavenger may react with oxygen, thereby reducing the amount of oxygen present to react with one or more components of the combination catalyst. Similarly, the scavenger may react with other oxygen rich or polar molecules, such as for example $CO_2$, alcohols, amines, water and the like, thereby reducing the impact of these catalyst poisons on the combination catalyst. Impurities or catalyst poisons can be added to the reactor deliberately but are more typically introduced through their inherent presence in one or more feed streams entering the reactor. For example, a comonomer or monomer feedstream may include small amounts of catalyst poisons. Although methods to "scrub" or otherwise remove impurities and poisons from feed streams are well known in the art, these methods often fail to remove impurities and catalyst poisons to trace levels (<ca. 5 ppm relative to the total moles of feedstream), and even when only trace levels remain, they can still negatively affect catalyst activity.

In an embodiment of the invention, a catalyst poison is added deliberately to a reactor. In an embodiment, a catalyst poison is added to a reactor before the introduction of a scavenger. Suitable catalyst poisons which may be added deliberately to the reactor include but are not limited to oxygen rich or polar molecules, such as for example $CO_2$, $H_2O$, alcohols, amines, $O_2$ and the like.

Mixtures of one or more catalysts poisons may also be present in a reactor, or deliberately added to a reactor. Hence, the term "catalyst poison" is meant to be inclusive or one or more catalysts poisons.

When inherently present in a reactor or polymerization zone (e.g. because purifications systems fail to remove the levels of catalyst poison to zero), such trace poisons will generally be present in amounts of less than about 100 ppm, especially less than about 10 ppm, or about 5 ppm.

If of the other hand, a poison is deliberately added to a reactor of a polymerization zone, then it can be added in an amount of up to about 500 molar ppm or less. For example, 250 ppm or less can be added, or 100 ppm or less can be added, or 50 ppm or less can be added, or 40 ppm or less, or 30 ppm or less may be added, or 20 ppm or less may be added, or 10 ppm or less may be added, or 5 ppm or less may be added.

In the present invention, when referring to a catalyst poison (e.g. $O_2$, $CO_2$, etc.) the term "molar ppm" refers to the parts per million in moles of a component such as a catalyst poison present in a reactor zone (or in the feed-stream entering the reactor zone), based on the total moles of gases present in a reactor zone (or in the feed-stream entering the reactor zone). Alternatively, the term "volume ppm" refers the parts per million in the volume of a catalyst poison present in a reactor zone, based on the total volume of gases present in a reactor zone. Molar ppm and volume ppm are equivalent under assumed ideal gas conditions.

In embodiments of the invention, polymerization is carried out in the presence of from 0.001 to 500 molar ppm of catalyst poison, or from 0.001 to 250 molar ppm or from 0.001 to 100 molar ppm of catalyst poison, or from 0.01 to 100 molar ppm, or from 0.01 to 50 molar ppm, or from 0.1 to 100 molar ppm, or from 0.1 to 50 molar ppm.

In an embodiment of the invention, the catalyst poison has a larger negative impact, in terms of reduced polymerization activity, on the group 4 single site catalyst than on the inorganic chromium catalyst.

In an embodiment of the invention, a catalyst poison preferentially reduces the activity (or productivity defined as the grams or polymer produced per gram of catalyst used) for active sites associated with the group 4 single site catalyst, while having a negligible effect or a more modest effect on the activity (or productivity) of active sites associated with the inorganic chromium catalyst.

In an embodiment of the invention, a scavenger preferentially enhances the performance of active sites associated with the group 4 single site catalyst, while having a negligible effect or a more modest effect on the active sites associated with the inorganic chromium catalyst.

In an embodiment of the invention, a scavenger preferentially enhances the activity (or productivity defined as the grams or polymer produced per gram of catalyst used) for active sites associated with the group 4 single site catalyst, while having a negligible effect or a more modest effect on the activity (or productivity) of active sites associated with the inorganic chromium catalyst.

Without wishing to be bound by theory, the enhanced effect of scavenger presence on the group 4 single site catalyst relative to the inorganic chromium catalyst is due to the fact that the inorganic chromium catalyst may be less sensitive, in terms of reduced activity, than the group 4 single site catalyst to the presence of impurities or catalyst poisons.

In some embodiments of the invention, the process may be carried out in the presence of an inherently present catalyst poison, a scavenger and a direct activity modifier such as carbon dioxide to control the ratio of polymer components made by a combination catalyst. For the effect of carbon dioxide on a combination catalyst comprising a chromium catalyst and a group 4 single site catalyst see commonly assigned U.S. Pat. Appl. No. 20120041147A1.

In an embodiment of the invention, between 0.001 and 500 molar ppm of carbon dioxide are deliberately added to a reactor or a polymerization zone.

In another aspect of the invention the process is carried out between 0 or 0.01 and 100 molar ppm of carbon dioxide.

In an embodiment of the present invention, the level of catalyst poison and scavenger present in a reactor system will be such that both catalyst components present in the combination catalyst (i.e. the inorganic chromium catalyst and the group 4 single site catalyst) will be at least partially active toward olefin polymerization.

In the present invention, a scavenger is any compound that will react with an impurity or catalyst poison present in a reactor to give as a product a relatively inert, or less reactive species in terms of reactions which negatively affect the activity of the combination catalyst components.

In the present invention, a catalyst poison is any compound that will react with a combination catalyst species to give a catalyst species which is relatively inert or, less reactive, toward polymerizing olefins (and optionally present alpha olefins).

In an embodiment of the present invention, the scavenger has the formula $Al(R)_n(R)_{3-n}$, where $R^1$ is a hydrocarbyl having from 1 to 20 carbon atoms; $R^2$ is independently selected from the group consisting of an alkoxide having from 1 to 20 carbon atoms, an aryloxide having from 6 to 20 carbon atoms, a halide, and a hydride; and n is a number from 1 to 3.

In an embodiment of the invention, the scavenger is an alkylaluminum compound. Non-limiting examples of suitable alkylaluminum compounds include, trimethylaluminum, triethylaluminum, triisobutylaluminum, tri-n-hexylaluminum, tri-n-octylaluminum, tri-iso-octylaluminum, triphenylaluminum, tripropylaluminum, diethylaluminum ethoxide, tributylaluminum, diisobutylaluminum hydride, diethylaluminum chloride and the like.

In an embodiment of the invention, the scavenger is a methylaluminoxane compound or a more highly substituted analogue thereof.

In an embodiment of the invention, the scavenger is supported. Without wishing to be bound by theory, use of a supported scavenger reduces direct interactions or reactions between the scavenger and the catalyst species within the combination catalyst, especially where the combination catalyst species are also supported. This is desirable, since it is known that metal alkyls can have an impact on the molecular weight performance of polymerization catalysts (see for example WO 2009/067201). Hence, use of a supported scavenger reduces the potential impact that the scavenger may have on the molecular weight of polymer components made by the inorganic chromium and group 4 single site catalysts present in the combination catalyst.

Preferred supports for use with the scavenger are inorganic oxides. The inorganic oxide may be any oxide of the metals from groups 2, 3, 4, 11, 12, 13 and 14 of the Period Table of Elements. Preferred inorganic oxides include silica, $SiO_2$; aluminophosphate, $AlPO_4$; magnesia, MgO; alumina, $Al_2O_3$; titania, $TiO_2$; zinc oxide, ZnO; and zirconia, $ZrO_2$ and the like or mixtures thereof, with $SiO_2$ being most preferred. When the inorganic oxide is a silica support, it will contain not less than 80% by weight of pure $SiO_2$, the balance being other oxides such as but not limited to oxides of Zr, Zn, Mg, Ti, Mg and P.

In an embodiment of the invention, the scavenger will be a trialkyl aluminum compound supported on silica. In a more particular embodiment of the invention, the scavenger will be triethylaluminum supported on silica.

The chromium catalyst used in the current invention is an inorganic chromium catalyst or mixture of catalysts capable of polymerizing olefins. An "inorganic chromium catalyst" is a chromium based catalyst which lacks a ligand forming a chromium-carbon bond (although reactive chromium-carbon bonds may be formed after contact of an inorganic chromium catalyst with a co-catalyst and are necessarily formed during a polymerization mechanism). Preferred inorganic chromium catalysts are selected from chromium oxide catalysts, or chromate catalysts.

In an embodiment of the invention, the inorganic chromium catalyst is relatively less sensitive to the presence of catalyst poisons or impurities present in the reactor (i.e. the inorganic chromium catalyst used in a combination catalyst shows a relatively smaller or negligible drop in activity when in the presence of catalyst poisons when compared to the single site catalyst used in the combination catalyst).

The inorganic chromium catalyst is preferably supported. Minor amounts of a secondary metal species such as titanium and or aluminum compounds may also be incorporated, together with the chromium. The inorganic chromium compound used to prepare the inorganic chromium catalyst can be any appropriate chromium salt or an inorganic chromium compound. For example, a silyl chromate or chromium trioxide (or a mixture thereof) may be used. Preferred inorganic chromium catalysts include chromium oxide catalysts and silyl chromate catalysts, with silyl chromate catalyst being especially preferred.

The chromium oxide catalyst in the combination catalyst may be prepared from chromium trioxide $CrO_3$, as used directly in formulation of the combination catalyst, or the chromium oxide catalyst in the combination catalyst may be obtained after converting suitable chromium compounds to $CrO_3$ under calcination and/or oxidizing conditions. Examples of compounds which are convertible to $CrO_3$ under calcination and/or oxidizing conditions are disclosed in U.S. Pat. Nos. 2,825,721; 3,023,203; 3,622,521; 4,011,382; 5,034,364 and 6,734,131, and include but are not limited to chromic acetyl acetone, chromic chloride, chromic nitrate, chromic acetate, chromic sulfate, ammonium chromate, ammonium dichromate and other soluble salts of chromate.

The silyl chromate (or silyl chromium) catalysts will have at least one group of the formula:

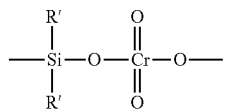

wherein R' is a hydrocarbyl group having from 1 to 14 carbon atoms.

In a preferred aspect of the invention, the silyl chromate catalyst is a bis-trihydrocarbylsilylchromate having the formula:

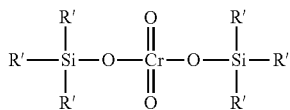

wherein R' is a hydrocarbyl group having from 1 to 14 carbon atoms. R' can independently be any type of hydrocarbyl group such as an alkyl, alkylaryl, arylalkyl or an aryl radical. Some non-limiting examples include methyl, ethyl, propyl, iso-propyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methyl-benzyl, phenyl, tolyl, xylyl, naphthyl, ethylphenyl, methylnaphthyl, dimethylnaphthyl, and the like. Illustrative of the preferred silylchromates but by no means exhaustive or complete of those that can be employed in this process are such compounds as bis-trimethylsilylchromate, bis-triethylsilylchromate, bis-tributylsilylchromate, bis-tri-isopentylsilylchromate, bis-tri-2-ethylhexylsilylchromate, bis-tridecylsilylchromate, bis-tri(tetradecyl)silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthylsilylchromate, polydiphenylsilylchromate, polydiethylsilylchromate and the like. Examples of bis-trihydrocarbylsilylchromate catalysts are also disclosed in U.S. Pat. Nos. 3,704,287 and 4,100,105.

In an embodiment of the invention, sufficient amounts of inorganic chromium catalyst are added to a support in order to obtain between 0.01% and 10% by weight of chromium, calculated as metallic chromium, based on the weight of the support. In another embodiment of the invention, sufficient amounts of inorganic chromium catalyst are added to a support in order to obtain between 0.05% to 3%, by weight of chromium, calculated as metallic chromium, based on the weight of the support.

The present invention is not limited to any particular procedure for supporting the inorganic chromium catalyst. Processes for depositing chromium compounds on supports are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright© 2001 by John Wiley & Sons, Inc.; for some non-limiting methods for supporting inorganic chromium catalysts see U.S. Pat. Nos. 3,704,287; 5,137,994; 6,022,933; 6,982,304; 6,013,595; 6,734,131; 6,958,375; and E.P. No. 640,625). For example, a chromium compound may be added by co-precipitation with the support material or by spray-drying with the support material. A chromium compound may also be added by a wet incipient method (i.e. wet impregnation) or similar methods using hydrocarbon solvents or other suitable diluents. Alternatively, a supported chromium compound may be obtained by mechanically mixing a solid chromium compound with a support material, followed by heating the mixture. In another variation, a chromium compound may be incorporated into the support during the manufacture thereof so as to obtain a homogeneous dispersion of the metal in the support. For example, a chromium compound may be spray dried with the constituent parts of a clay-inorganic oxide agglomerate to provide a supported chromium catalyst, as taught in U.S. Pat. No. 6,734,131.

A supported inorganic chromium catalyst may arise from activation of a suitable chromium precursor compound. Activation may involve calcination and oxygenation of a suitable chromium catalyst precursor (as is preferred in the case in the formation of a chromium oxide catalyst) or the addition of co-catalyst compounds (as is preferred in the case of silyl chromate catalyst). For example, activation may be accomplished by calcination in steam, dry air or another oxygen containing gas at temperatures up to the sintering temperature of the support. Activation temperatures are in the range of 350° C. to 950° C., preferably from 500° C. to 900° C. and activation times are from about 10 mins. to about 72 hrs. The supported inorganic chromium catalyst may optionally be reduced after activation using for example, carbon monoxide or a mixture of carbon monoxide and nitrogen.

The supported inorganic chromium catalysts may optionally comprise one or more than one co-catalyst and mixtures thereof. In the present invention, the term "inorganic chromium catalyst" includes polymerization active inorganic chromium compounds per se, as well as well as catalysts comprising a polymerization active combination of one or more inorganic chromium compounds and one or more co-catalysts. The co-catalyst can be added to the support using any well known method. The co-catalyst and inorganic chromium catalyst can be added to the support in any order or simultaneously. Alternatively, the co-catalyst can be added to the supported inorganic chromium catalyst in situ. By way of a non-limiting example, the co-catalyst is added as a solution or slurry in hydrocarbon solvent to the supported inorganic chromium catalyst which is optionally also in hydrocarbon solvent.

Co-catalysts include compounds represented by formula:

where M* represents an element of the Group 1, 2 or 13 of the Periodic Table, a tin atom or a zinc atom; and each $R^3$ independently represents a hydrogen atom, a halogen atom (e.g., chlorine, fluorine, bromine, iodine and mixtures thereof), an alkyl group (e.g., methyl, ethyl, propyl, pentyl, hexyl, heptyl, octyl, decyl, isopropyl, isobutyl, s-butyl, t-butyl), an alkoxy group (e.g., methoxy, ethoxy, propoxy, butoxy, isopropoxy), an aryl group (e.g., phenyl, biphenyl, naphthyl), an aryloxy group (e.g., phenoxy), an arylalkyl group (e.g., benzyl, phenylethyl), an arylalkoxy group (benzyloxy), an alkylaryl group (e.g., tolyl, xylyl, cumenyl, mesityl), or an alkylaryloxy group (e.g., methylphenoxy), provided that at least one $R^3$ is selected from a hydrogen atom, an alkyl group having 1 to 24 carbon atoms or an aryl, arylalkyl or alkylaryl group having 6 to 24 carbon atoms; and n is the oxidation number of M*.

Preferred co-catalysts are organoaluminum compounds having the formula:

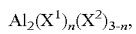

where $(X^1)$ is a hydrocarbyl having from 1 to about 20 carbon atoms; $(X^2)$ is selected from alkoxide having from 1 to about 20 carbon atoms; an aryloxide having from 6 to 20 carbon atoms; halide; or hydride; and n is a number from 1 to 3, inclusive. Specific examples of $(X^1)$ moieties include, but are not limited to, ethyl, propyl, n-butyl, sec-butyl, isobutyl, hexyl, and the like. In another aspect, $(X^2)$ may be independently selected from fluoro or chloro. The value of n is not restricted to be an integer, therefore this formula includes sesquihalide compounds or other organoaluminum cluster compounds.

Some non-limiting examples of aluminum co-catalyst compounds that can be used in this invention include, but are not limited to, trialkylaluminum compounds, dialkylaluminum halide compounds, dialkylaluminum alkoxide compounds, dialkylaluminum hydride compounds, and combinations thereof. Specific examples of organoaluminum co-catalyst compounds that are useful in this invention include, but are not limited to: trimethylaluminum (TMA); triethylaluminum (TEA); triisopropylaluminum; diethylaluminum ethoxide; tributylaluminum; disobutylaluminum hydride; triisobutylaluminum; and diethylaluminum chloride.

The molar ratio of co-catalyst to inorganic chromium catalyst can be about from about 1:1 to about 30:1. Alternatively, the molar ratio of co-catalyst to inorganic chromium catalyst can be about from about 1:1 to about 20:1. In another embodiment, the molar ratio of co-catalyst to inorganic chromium catalyst can be about from about 5:1 to about 20:1.

Preferred single site catalysts for use in the process of the current invention are group 4 single site catalysts (i.e. single site catalysts comprising a group 4 transition metal as the active center). Single site catalysts include metallocene catalysts, so called "constrained geometry catalysts" and catalysts comprising at least one phosphinimine ligand or at least one ketimine ligand. The single site catalyst should be chosen so as to have different sensitivity to scavenger (in terms of activity) than the inorganic chromium catalyst chosen.

In an embodiment of the invention, the activity of the single site catalyst will be more positively impacted than the activity of the inorganic chromium catalyst n the presence of scavenger.

In a preferred aspect of the invention, the group 4 single site catalyst will have at least one phosphinimine ligand or at least one ketimine ligand. Especially preferred are group 4 single site catalysts having at least one phosphinimine ligand.

A single site catalyst having at least one phosphinimine ligand or ketimine ligand can be represented by the following formula:

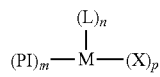

wherein M is a group 4 metal; Pl is independently a phosphinimine ligand or a ketimine ligand; L is a monoanionic ligand selected from the group consisting of a cyclopentadienyl type ligand or a heteroatom ligand; X is an activatable ligand; m is 1 or 2; n is 0 or 1; and p is an integer and the sum of m+n+p equals the valence state of M. The preferred metals, M are selected from the group 4 transition metals with titanium being most preferred.

A phosphinimine ligand is defined by the formula $R_3P{=}N{-}$, where N is bonded to the transition metal, each R is independently selected from the group consisting of a hydrogen atom; a halogen atom; a $C_{1-20}$ hydrocarbyl radical which is un-substituted or further substituted by a halogen atom, a $C_{1-8}$ alkoxy radical, a $C_{6-10}$ aryl or aryloxy radical; an amido radical which is unsubstituted or substituted; a silyl radical which is unsubstituted or substituted by alkyl, alkoxy, aryl radicals or aryloxy radicals, and a germanyl radical which is unsubstituted or substituted by alkyl, alkoxy, aryl radicals or aryloxy radicals.

In an aspect of the invention, the phosphinimine ligand is substituted with three hydrocarbyl radicals which can be the same or different. In another aspect of the invention, the phosphinimine ligand is substituted with three tert-butyl radicals.

As used herein, the term "ketimine ligand" refers to a ligand which: (a) is bonded to the transition metal via a metal-nitrogen atom bond; (b) has a single substituent on the nitrogen atom, (where this single substituent is a carbon atom which is doubly bonded to the N atom); and (c) has two substituents Sub 1 and Sub 2 (described below) which are bonded to the carbon atom. Conditions a, b and c are illustrated below:

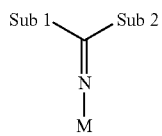

The substituents "Sub 1" and "Sub 2" may be the same or different and can be bonded to each other by a bridging group to form a ring. The bridging group can be any saturated or unsaturated alkyl group or aryl group including fused ring aryl groups, where the alkyl or aryl groups can optionally contain heteroatoms or be further substituted by alkyl, aryl or heteroatom containing alkyl or aryl groups. Exemplary substituents include hydrocarbyls having from 1 to 20 carbon atoms, silyl groups, amido groups and phosphido groups. For reasons of cost and convenience, these substituents may both be hydrocarbyl radicals, especially simple alkyl radicals (e.g. $C_{1-6}$) such as but not limited to tertiary butyl radicals.

The cyclopentadienyl type ligand L is a ligand comprising a 5-membered carbon ring having delocalized bonding within the ring and bound to the metal atom through $\eta^5$ bonds. Thus a cyclopentadienyl type ligand may be a substituted or unsubstituted cyclopentadienyl ligand (Cp), but also includes, substituted or unsubstituted indenyl, and fluorenyl ligands and other fused ring systems which contain a 5-membered carbon ring having delocalized bonding within the ring and bound to the metal atom through $\eta^5$ bonds.

The cyclopentadienyl type ligand L can be un-substituted, partially substituted, or fully substituted with one or more substituents selected from the group consisting of: halogens; $C_{1-10}$ hydrocarbyl radicals in which the hydrocarbyl substituents are un-substituted or further substituted with a halogen atom and/or $C_{1-8}$ alkyl radical; a $C_{1-8}$ alkyl radical; a $C_{1-8}$ alkoxy radical; a $C_{6-10}$ aryl or aryloxy radical in which the aryl or aryloxy are un-substituted or further substituted by a halogen atom and/or a $C_{1-8}$ alkyl radical; an amido radical which is unsubstituted or substituted by alkyl or aryl radicals; a phosphido radical which is unsubstituted or substituted by alkyl or aryl radicals; a silyl radical which unsubstituted or substituted by alkyl, alkoxy, aryl radicals or aryloxy radicals; and a germanyl radical which is unsubstituted or substituted by alkyl, alkoxy, aryl radicals or aryloxy radicals.

In particular embodiments of the invention, the cyclopentadienyl type ligand is a cyclopentandienyl ligand having at least a perfluoroaryl substituent or at least a partially fluorinated aryl substituent.

In other particular embodiments of the invention, the cyclopentadienyl type ligand is a cyclopentadienyl ligand Cp, which is substituted by a perfluoroaryl substituent such as for example a pentafluorophenyl group and a $C_{1-10}$ alkyl substituent in a 1,2 or a 1,3 substitution pattern.

As used herein, the term heteroatom ligand refers to a ligand that contains at least one heteroatom selected from the group consisting of boron, nitrogen, oxygen, phosphorus or sulfur. The heteroligand may be sigma or pi-bonded to the metal. Exemplary heteroligands include silicon-containing heteroligands, amido ligands, alkoxy ligands, boron heterocyclic ligands (e.g. borabenzene ligands) and phosphole ligands, as further described below.

Silicon containing heteroligands are defined by the formula:

$$-(\mu)SiR^xR^yR^z$$

wherein the — denotes a bond to the transition metal and p is sulfur or oxygen.

The substituents on the Si atom, namely $R^x$, $R^y$ and $R^z$ are required in order to satisfy the bonding orbital of the Si atom. The use of any particular substituent $R^x$, $R^y$ or $R^z$ is not specifically defined, but it is preferred that each of $R^x$, $R^y$ and $R^z$ is a $C_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond; and (b) the presence of two substituents, which are typically alkyl, phenyl, trialkyl or triaryl silyl groups on the nitrogen atom.

The terms "alkoxy" and "aryloxy" are also intended to convey their conventional meaning. Thus, these ligands are characterized by (a) a metal oxygen bond; and (b) the presence of a hydrocarbyl group bonded to the oxygen atom. The hydrocarbyl group may be a $C_{1-10}$ straight chained, branched or cyclic alkyl radical or a $C_{6-13}$ aromatic radical which radicals are un-substituted or further substituted by one or more $C_{1-4}$ alkyl radicals (e.g. 2,6 di-tertiary butyl phenoxy).

Boron heterocyclic ligands are characterized by the presence of a boron atom in a closed ring ligand (e.g. borabenzene ligands which are un-substituted or may be substituted by one or more halogen atoms, $C_{1-10}$ alkyl groups, and/or $C_{1-10}$ alkyl groups containing a hetero atom (e.g. O, or N atoms)). This definition includes heterocyclic ligands that may also contain a nitrogen atom in the ring. These ligands are well known to those skilled in the art of olefin polymerization and are fully described in the literature (see, for example, U.S. Pat. Nos. 5,637,659; 5,554,775; and references cited therein).

The term "phosphole" is also meant to convey its conventional meaning. "Phospholes" are cyclic dienyl structures having four carbon atoms and one phosphorus atom in the closed ring. The simplest phosphole is $C_4H_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; or silyl or alkoxy radicals. Phosphole ligands are also well known to those skilled in the art of olefin polymerization and are described as such in U.S. Pat. No. 5,434,116.

In the current invention, the term "activatable", means that the ligand X, may be cleaved from the metal center M, via a protonolysis reaction or abstracted from the metal center M, by suitable acidic or electrophilic activator compounds respectively, which are further described below. The activatable ligand X may also be transformed into another ligand which is cleaved or abstracted from the metal center M. Protonolysis or abstraction reactions generate an active "cationic" metal center which can polymerize olefins, as is well known in the art. In an aspect of the present invention, the activatable ligand, X is independently selected from the group consisting of a hydrogen atom; a halogen atom, a $C_{1-10}$ hydrocarbyl radical, including a benzyl radical; a $C_{1-10}$ alkoxy radical; a $C_{6-10}$ aryl oxide radical, where each of the hydrocarbyl, alkoxy, and aryl oxide radicals may be un-substituted or further substituted by; an amido radical or a phosphido radical. Two X ligands may also be joined to one another and form for example, a substituted or unsubstituted diene ligand (i.e. 1,3-diene); or a delocalized heteroatom containing group such as an acetate or acetamidinate group. In a most convenient aspect of the invention, each X is independently selected from the group consisting of a halide atom and a $C_{1-4}$ alkyl radical.

In an aspect of the invention, the group 4 single site catalyst will have the formula $(L)_a(Pl)_bM(X)_c$, where L is a cyclopentadienyl type ligand defined as above, Pl is a phosphinimine, M is a group 4 transitional metal, preferably Ti, Zr or Hf, and each X independently, is an activatable ligand and "a" is 0 or 1; "b" is 1 or 2; a+b=2; "c" is 1 or 2, and a+b+c=valance of the metal M.

In an embodiment of the invention, the single site catalyst is represented by the formula $L(Pl)MX_2$ where L is a cyclopentadienyl type ligand defined as above, Pl is a phosphinimine ligand, M is Ti, Zr or Hf, and X is an activatable ligand.

The metallocene catalysts contemplated for use with the current invention may have from one to three cyclopentadienyl type ligands defined as above, provided that the remaining ligands are activatable ligands. For some non-limiting examples of metallocene catalysts see for example U.S. Pat. Nos. 4,808,561; 4,701,432; 4,937,301; 5,324,800; 5,633,394; 4,935,397; 6,002,033; and 6,489,413 which are incorporated herein by reference.

In an aspect of the invention, metallocene catalysts are represented by the formula:

$$L^2_nMX_{4-n}$$

where M is a group 3 or 4 transition metal; each X is independently an activatable ligand defined as above, each $L^2$ group is independently a cyclopentadienyl type ligand further described below and n is from 1 to 3. Preferably M is a group 4 transition metal with a valency of 4.

The cyclopentadienyl type ligand $L^2$ is a ligand comprising a 5-membered carbon ring having delocalized bonding within the ring and bound to the metal atom through $\eta^5$ bonds. The 5-membered ring can be un-substituted, partially substituted, or fully substituted with one or more substituents.

The cyclopentadienyl type ligands $L^2$ in metallocene catalysts also include heterocyclic analogues of a 5-membered carbon ring. For example, the $L^2$ ring may typically comprise atoms selected from the group consisting of Groups 13 to 16 atoms, and more particularly, the atoms that make up the $L^2$ ligands are selected from the group consisting of carbon, nitrogen, oxygen, silicon, sulfur, phosphorous, germanium, boron and aluminum and combinations thereof, wherein carbon makes up at least 50% of the ring members.

If more than one $L^2$ ligand is present in a metallocene, then the ligands represented by $L^2$ may be the same or different cyclopentadienyl type ligands, either or both of which may contain heteroatoms and either or both of which may be substituted or unsubstituted. In one embodiment, $L^2$ is independently selected from the group consisting of cyclopentadienyl, indenyl, tetrahydroindenyl, fluorenyl, and substituted derivatives of each.

Non-limiting examples of substituents which may be present on $L^2$ include hydrogen radicals, halogens, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkylcarbamoyls, acyloxys, acylaminos, aroylaminos, and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents for $L^2$ include olefins such as but not limited to olefinically unsaturated substituents including vinyl-terminated ligands, for example 3-butenyl, 2-propenyl, 5-hexenyl and the like. In one embodiment, at least two substituents on a $L^2$, for example two adjacent substituents are joined to form a ring structure having from 3 to 30 atoms selected from the group consisting of carbon, nitrogen, oxygen, phosphorous, silicon, germanium, aluminum, boron and combinations thereof. Also, a substituent such as 1-butanyl may form a bonding association to the element M.

Two $L^2$ ligands may be bridged to each other by at least one bridging group, (A). In these "bridged metallocenes" (A) is chemically bonded to each $L^2$. Non-limiting examples of bridging group (A) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain further substitution, such as alkyl, aryl, alkoxy, halide etc. Further non-limiting examples of bridging group (A) are represented by $C_1$ to $C_6$ alkylenes, substituted $C_1$ to $C_6$ alkylenes, oxygen, sulfur, $R'''_2C=$, $R'''_2Si=$, $—Si(R''')_2—Si(R''')_2—$, $R'''_2Ge=$, $R'''P=$ (wherein "=" represents two chemical bonds), where R''' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R''' may be joined to form a ring or ring system. In one embodiment, the bridged metallocene catalyst has two bridging groups (A) joining two $L^2$ ligands.

The constrained geometry catalyst contemplated for use with the current invention has a cyclopentadienyl type ligand, $L^3$ forming a bringing moiety with a heteroatom ligand. Such compounds are well known in the art and are described in for example, U.S. Pat. Nos. 5,057,475; 5,096,867; 5,064,802; 5,132,380; 5,703,187; and 6,034,021 all of which are incorporated by reference herein in their entirety. Constrained geometry catalysts are conveniently represented by the formula:

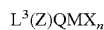

$L^3(Z)QMX_n$ where M is a group 3 or 4 transition metal, each X is independently an activatable ligand defined as above; $L^3$ is a cyclopentadienyl type ligand comprising a 5-membered carbon ring having delocalized bonding within the ring and bound to the metal atom through $\eta^5$ bonds and has at least one attachment point to Z; n is 1 or 2 depending on the valence of the metal; Q is a heteroatom-containing ligand bonded to the metal, and Z is a bridging group bonded to $L^3$ and Q. Preferably, M is a group 4 transition metal.

The cyclopentadienyl type ligand $L^3$ which is bonded to Z at one position can further be un-substituted, partially substituted, or fully substituted with one or more substituents selected from halogens; $C_{1-10}$ hydrocarbyl radicals in which the hydrocarbyl substituents are unsubstituted or further substituted with a halogen atom and/or $C_{1-8}$ alkyl radical; a $C_{1-8}$ alkyl radical; a $C_{1-18}$alkoxy radical; a $C_{6-10}$ aryl or aryloxy radical in which the aryl or aryloxy are un-substituted or further substituted by a halogen atom and/or a $C_{1-8}$ alkyl radical; an amido radical which is unsubstituted or substituted by alkyl or aryl radicals; a phosphido radical which is unsubstituted or substituted by alkyl or aryl radicals; a silyl radical which unsubstituted or substituted by alkyl, alkoxy, aryl radicals or aryloxy radicals; and a germanyl radical which is unsubstituted or substituted by alkyl, alkoxy, aryl radicals or aryloxy radicals. The cyclopentadienyl type ligand $L^3$ also includes substituted or unsubstituted indenyl, fluorenyl or other fused ring systems which contain a 5-membered carbon ring having delocalized bonding within the ring and bound to the metal atom through $\eta^5$ bonds.

The bridging group Z is a moiety comprising boron, or a member of group 14 of the periodic table of the elements, and optionally sulfur or oxygen, the moiety having up to 40 non-hydrogen atoms, and optionally $L^3$ and Z together form a fused ring system The group Q is an anionic or neutral ligand group bonded to Z and M, comprising nitrogen, phosphorus, oxygen or sulfur and having up to 40 non-hydrogen atoms, and optionally Q and Z together form a fused ring system.

In an aspect of the invention, Q is $—O—$, $—S—$, $NR*—$, $—PR*—$, or a neutral two electron donor ligand selected from the group consisting of $OR*$, $SR*$, $NR*_2$, $PR*_2$ where $R*$ each occurrence is independently selected from the group consisting of hydrogen, alkyl, aryl, silyl, halogenated alkyl, halogenated aryl groups having up to 20 non-hydrogen atoms, and mixtures thereof, or two or more $R*$ groups from Z, Q or both Z and Q form a fused ring system.

In an aspect, Z is $SiR*_2$, $CR*_2$, $SiR*_2SiR*_2$, $CR*_2CR*_2$, $CR*=CR*$, $CR*_2SiR*_2$, $GeR*_2$, $BR*$, $BR*_2$; where: $R*$ each occurrence is independently selected from the group consisting of hydrogen, alkyl, aryl, silyl, halogenated alkyl, halogenated aryl groups having up to 20 non-hydrogen atoms, and mixtures thereof, or two or more $R*$ groups from Z, Q or both Z and Q form a fused ring system.

In an aspect of the invention, Q is a substituted or un-substituted amido or phosphido group, preferably a substituted group with a $C_{1-10}$ alkyl, a $C_6$-$C_{10}$ aryl, or a silyl group substituent.

Further single site catalysts which may useful in the process of the current invention include catalysts comprising phenoxyimine and similar closely related ligands such as those described in U.S. Pat. Nos. 6,309,997; 6,399,724; 6,770,723 and 6,593,266; and catalysts comprising bidentate or tridentate ligands having a group 15 atom such as those described in U.S. Pat. Nos. 6,274,684; 6,689,847; 6,583,083; 6,300,438; 6,417,304; 6,300,439; 6,271,325; 6,320,002; 6,303,719; and 6,103,657, so long as the catalyst chosen has a differential sensitivity to scavenger (in terms of activity) relative to the inorganic chromium catalyst.

The single site catalyst used in the current invention will typically require activation with one or more suitable activators. Suitable catalyst activators are selected from the group consisting of alkylaluminoxanes, ionic activators and electrophilic borane compounds, with alkylaluminoxanes and ionic activators being preferred.

The alkylaluminoxanes are complex aluminum compounds of the formula:

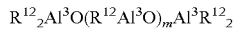

wherein each $R^{12}$ is independently selected from the group consisting of $C_{1-20}$ hydrocarbyl radicals and m is from 3 to 50. Optionally a hindered phenol can be added to the alkylaluminoxane to provide a molar ratio of $Al^3$:hindered phenol of from 2:1 to 5:1 when the hindered phenol is present.

In an aspect of the invention, $R^{12}$ of the alkylaluminoxane is a methyl radical and m is from 10 to 40. In an aspect of the invention, the molar ratio of $Al^3$:hindered phenol, if it is present, is from 3.25:1 to 4.50:1. Preferably the phenol is substituted in the 2, 4 and 6 position by a $C_{2-6}$ alkyl radical. Desirably the hindered phenol is 2,6-di-tertbutyl-4-ethyl-phenol.

The alkylaluminoxanes are typically used in substantial molar excess compared to the amount of group single site catalyst. The $Al^3$:single site catalyst transition metal molar ratios are from 10:1 to 10,000:1, preferably about 30:1 to 500:1.

The ionic activators include activators that activate the organometallic complex by protonolysis of a suitable activatable ligand or by the electrophilic abstraction of a suitable activatable ligand. Although the "ionic activator" may abstract or cleave one or more activatable ligand so as to ionize the catalyst center into a "cation", it does not covalently bond with the catalyst, providing instead, sufficient distance between the catalyst metal center and the ionizing activator to permit a polymerizable olefin to enter the resulting active site.

The ionic activators used in the present invention are selected from compounds of the formula:

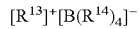

wherein B is a boron atom, $R^{13}$ is a cyclic $C_{5-7}$ aromatic cation or a triphenyl methyl cation and each $R^{14}$ is independently selected from the group consisting of phenyl radicals which are un-substituted or substituted with 3 to 5 substituents selected from the group consisting of a fluorine atom, a $C_{1-4}$ alkyl or alkoxy radical which is un-substituted or substituted by a fluorine atom; and a silyl radical of the formula —Si—$(R^{15})_3$; wherein each $R^{15}$ is independently selected from the group consisting of a hydrogen atom and a $C_{1-4}$ alkyl radical; and compounds of the formula:

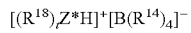

wherein B is a boron atom, H is a hydrogen atom, Z* is a nitrogen atom or phosphorus atom, t is 2 or 3 and $R^{18}$ is selected from the group consisting of $C_{1-8}$ alkyl radicals, a phenyl radical which is un-substituted or substituted by up to three $C_{1-4}$ alkyl radicals, or one $R^{18}$ taken together with the nitrogen atom may form an anilinium radical and $R^{14}$ is as defined above.

Specific ionic activators that may be used in the current invention include but are not limited to: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl) ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, tropillium phenyltrispentafluorophenyl borate, triphenylmethylium phenyltrispentafluorophenyl borate, benzene (diazonium) phenyltrispentafluorophenyl borate, tropillium tetrakis (2,3,5,6-tetrafluorophenyl)borate, triphenylmethylium tetrakis (2,3,5,6-tetrafluorophenyl) borate, tropillium tetrakis (3,4,5-trifluorophenyl)borate, benzene (diazonium) tetrakis (3,4,5-trifluorophenyl)borate, tropillium tetrakis (1,2,2-trifluoroethenyl)borate, triphenylmethylium tetrakis (1,2,2-trifluoroethenyl)borate, tropillium tetrakis (2,3,4,5-tetrafluorophenyl)borate, and triphenylmethylium tetrakis (2,3,4,5-tetrafluorophenyl)borate.

Some readily commercially available ionic activators include: N,N-dimethylaniliniumtetrakispentafluorophenyl borate; triphenylmethylium tetrakispentafluorophenyl borate (tritylborate); and trispentafluorophenyl borane.

The ionic activators may also have an anion containing at least one group comprising an active hydrogen or at least one of any substituent able to react with the support. As a result of these reactive substituents, the anionic portion of these ionic activators may become bonded to the support under suitable conditions. One non-limiting example includes ionic activators with tris(pentafluorophenyl)(4-hydroxyphenyl) borate as the anion. These tethered ionic activators are more fully described in U.S. Pat. Nos. 5,834,393; 5,783,512; and 6,087,293.

The electrophilic borane compounds that may be used in the present invention include compounds of the formula:

wherein $R^{14}$ is as defined above.

The ionic activators or electrophilic borane compounds may be used in amounts which provide a molar ratio of group 4 transition metal to boron that will be from 1:1 to 1:6, preferably from 1:1 to 1:2.

Optionally, mixtures of alkylaluminoxanes, ionic activators, and electrophilic boranes may be used as activators in the second catalyst component of the current invention.

In a preferred aspect of the invention, the single site catalyst is supported.

The present invention is not limited to any particular procedure for supporting the single site catalyst. Processes for depositing a single site catalyst complex as well as an activator on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright© 2001 by John Wiley & Sons, Inc.; for some non-limiting methods to support a single site catalyst see U.S. Pat. No. 5,965,677). For example, the single site catalyst may be added by co-precipitation with the support material. The activator can be added to the support before and/or after the single site catalyst or together with the single site catalyst. Optionally, the activator can be added to a supported single site catalyst in situ or the single site catalyst may be added to the support in situ or the single site catalyst can be added to a supported activator in situ. The single site catalyst may be slurried or dissolved in a suitable diluent or solvent and then added to the support. Suitable solvents or diluents include but are not limited to hydrocarbons and mineral oil. The single site catalyst may be added to the solid support, in the form of a solid, solution or slurry, followed by the addition of the activator in solid form or as a solution or slurry. Single site catalyst, activator, and support can be mixed together in the presence or absence of a solvent. In an embodiment, a solution or slurry containing a single site catalyst and activator in a hydrocarbon is added to a support.

The amount of single site catalyst added to the support should be sufficient to obtain between 0.001 and 10% or between 0.01% and 10%, by weight of group 4 transition metal, calculated as metallic Ti, Zr, Hf or combined total thereof, based on the weight of the support. In another embodiment, the single site catalyst added to the support should be sufficient to obtain between 0.01% to 3%, by weight of group 4 transition metal, calculated as metallic Ti, Zr, Hf or combined total thereof, based on the weight of the support.

The inorganic chromium and single site catalysts may be supported on one or more of any known support material. Catalyst supports are well known in the art and may be chosen from a wide range of well known materials or mixtures thereof. For example, catalyst supports include inorganic oxides, such as but not limited to silica gel; magnesium halides; zeolites; layered clay minerals; agglomerated support materials; and polymer supports such as but not limited to polyethylene, polypropylene, polystyrene, or poly(aminostyrene) supports. In some cases, a support material may also act as a polymerization catalyst activator or as a co-catalyst. For example, supports that are Lewis acidic, contain aluminoxane functionalities, or where the support is capable of performing similar chemical functions as an aluminoxane, are suitable for use as a "support-activator".

Preferred supports for use in the current invention are inorganic oxides, and agglomerates of clays or clay minerals with inorganic oxides.

The inorganic oxide may be any oxide of the metals from groups 2, 3, 4, 11, 12, 13 and 14 of the Period Table of Elements. Preferred inorganic oxides include silica, $SiO_2$; aluminophosphate, $AlPO_4$; magnesia, MgO; alumina, $Al_2O_3$; titania, $TiO_2$; zinc oxide, ZnO; and zirconia, $ZrO_2$ and the like or mixtures thereof, with $SiO_2$ being most preferred. When the inorganic oxide is a silica support, it will contain not less than 80% by weight of pure $SiO_2$, the balance being other oxides such as but not limited to oxides of Zr, Zn, Mg, Ti, Mg and P.

Generally, the inorganic oxide support will contain acidic surface hydroxyl groups that will react with a polymerization catalyst. Prior to use, the inorganic oxide may be dehydrated to remove water and to reduce the concentration of surface hydroxyl groups. For example, the inorganic oxide may be heated at a temperature of at least 200° C. for up to 24 hrs, typically at a temperature of from about 500° C. to about 800° C. for about 2 to 20 hrs, preferably 4 to 10 hrs. The resulting support will be free of adsorbed water and should have a surface hydroxyl content from about 0.1 to 5 mmol/g of support, preferably from 0.5 to 3 mmol/g.

Although heating is the preferred means of removing surface hydroxyl groups present in inorganic oxides, such as silica, the hydroxyl groups may also be removed by other removal means, such as chemical means. For example, a desired proportion of OH groups may be reacted with a suitable chemical agent, such as a hydroxyl reactive aluminum compound (e.g. triethylaluminum) or a silane compound.

A silica support that is suitable for use in the present invention has a high surface area and is amorphous. By way of example, useful silicas are commercially available under the trademark of Sylopol® 958, 955 and 2408 from Davison Catalysts, a Division of W. R. Grace and Company and ES-70W™ from Ineos Silica.

The clay or clay mineral (i.e. "layered silicates") contemplated for use in the current invention can be amorphous or crystalline and has a three dimensional structure which has its strongest chemical bonds in only two dimensions. In general, clay minerals may be composed of layered silicates of nanometer scale thickness. A silicate layer is comprised of silicate sheets fused by alumina or magnesia. Stacking of the silicate layers provides a clay gallery, which is represented by a regular interlayer spacing between the silicate layers. The gallery typically contains hydrated inorganic cations, the nature of which is determined by the source of the clay mineral. Calcium, $Ca^{2+}$, sodium, $Na^+$ and potassium, $K^+$ are common.

The clay mineral is not specifically defined, but preferably includes any natural or synthetic layered silicate having a negative charge below zero and which is capable of forming an agglomerate with a inorganic oxide such as silica.

Non-limiting examples of clay minerals which are useful in the current invention generally are smectites, vermiculites, and micas; including phyllosilicate, montmorillonite, hectorite, betonite, laponite, saponite, beidellite, stevensite, kaolinite, hallosite, and magadite. Of these, montmorillonite (MMT) is preferred.

The interlaminar cations found in clay can be ion exchanged with other cations. The cation exchange capacity (CEC) of a clay is a measure of the exchangeable cations present in the clay or the total quantity of positive charge that can be absorbed onto the clay. It may be measured in SI units as the positive charge (coulombs) absorbed by the clay per unit of mass of the clay. It is also conveniently measured in milliequivalents per gram of clay (meq/g) or per 100 gram of clay (meq/100 g). 96.5 coulombs per gram of cation exchange capacity is equal to 1 milliequivalent per gram of cation exchange capacity.

The term "agglomerate" in the current invention refers to a support in which particles of an inorganic oxide and a layered silicate or clay are held together by a variety of physical-chemical forces. An agglomerate is distinct from a simple "support blend" in which two types of support material have merely been stirred or mixed into one another. An "agglomerate" or "agglomerate support" is generally composed of inorganic oxide particles (i.e. primary particles) and clay or clay/inorganic oxide particles (i.e. smaller secondary particles), where inorganic oxide particles (i.e. primary particles) and clay particles or clay/inorganic oxide particles (i.e. secondary particles) are joined at some points of contact.

Agglomerate supports comprising a clay mineral and an inorganic oxide, may be prepared using a number techniques well known in the art including pelletizing, extrusion, drying or precipitation, spray-drying, shaping into beads in a rotating coating drum, and the like. A nodulization technique may also be used. Methods to make agglomerate supports comprising a clay mineral and an inorganic oxide include spray-drying a slurry of a clay mineral and an inorganic oxide. Methods to make agglomerate supports comprising a clay mineral and an inorganic oxide are disclosed in U.S. Pat. Nos. 6,686,306; 6,399,535; 6,734,131; 6,559,090 and 6,958,375.

For the combination catalyst, the molar ratio of inorganic chromium catalyst to group 4 single site catalyst is not specifically defined, but the Cr:group 4 metal molar ratio can be in the range of 100:1 to 1:100. In further embodiments of the invention the molar ratio of Cr:group 4 metal can be from 50:1 to 1:50 or from 25:1 to 1:25 or 10:1 to 1:10 or from 5:1 to 1:5 or from 15:1 to 1:2 or from 15:1 to 1:1.

In an embodiment of the invention the combination catalyst is a dual catalyst. The inorganic chromium catalyst and the group 4 single site catalyst as well as one or more activators and optional co-catalysts, may be co-immobilized on a support using any known method. Processes for depositing chromium compounds, single site catalysts, as well as activators and co-catalysts on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright© 2001 by John Wiley & Sons, Inc.; for some non-limiting methods to support chromium compounds see: U.S. Pat. Nos. 6,982,304; 6,013,595; 6,734,131; 6,958,375; and E.P. No. 640,625; for some non-limiting methods to support a single site catalyst see U.S. Pat. No. 5,965,677). For example, catalysts, co-catalysts and activators may be added by co-precipitation or spray drying with the support material or alternatively by a wet incipient method (i.e. wet impregnation) or similar method using hydrocarbon solvents/diluents or other suitable solvents/diluents.

In an embodiment of the invention, the combination catalyst is a dual catalyst comprising:
a) a silyl chromate catalyst; and
b) a group 4 single site catalyst;
co-supported on an inorganic oxide, wherein the group 4 single site catalyst comprises:
i) a phosphinimine catalyst having the formula:

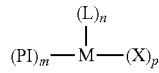

wherein, M is a group 4 metal; Pl is a phosphinimine ligand; L is a cyclopentadienyl type ligand; X is an activatable ligand; m is 1 or 2; n is 0 or 1; and p is an integer and the sum of m+n+p equals the valence state of M; and
ii) an activator;
wherein, the molar ratio of Cr to group 4 metal is from 5:95 to 95:5.

The inorganic chromium catalyst and the group 4 single site catalyst as well as activators and optional co-catalysts can be added to the support material in any order. The dual catalyst system can be prepared in a stepwise manner in which catalyst precursors or intermediates are isolated or not isolated.

In an embodiment of the invention, the inorganic chromium catalyst and the optional co-catalyst are added to a support prior to the addition of the group 4 single site catalyst and activator. The group 4 single site catalyst and activator can be added simultaneously or in pre-mixed form or they may be added separately and in any order. The group 4 single site catalyst and activator can also be added to the supported inorganic chromium catalyst in situ (i.e. in a polymerization reactor or on route to a reactor).

In an embodiment of the invention, the combination catalyst is a dual catalyst which is made by a method comprising the following sequence of steps:
i) calcining an inorganic oxide selected from the group consisting of $SiO_2$, $Al_2O_3$, MgO, $AlPO_4$, $TiO_2$, $ZrO_2$ and mixtures thereof;
ii) adding a silyl chromate to the inorganic oxide;
iii) adding an organoaluminum co-catalyst to the inorganic oxide;
iv) adding a mixture comprising a group 4 single site catalyst and an activator to the inorganic oxide; wherein the group 4 single site catalyst has the formula:

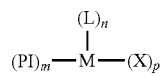

wherein, M is a group 4 metal; Pl is a phosphinimine ligand; L is a cyclopentadienyl type ligand; X is an activatable ligand; m is 1; n is 1; and p is an integer and the sum of m+n+p equals the valence state of M; and wherein the activator is selected from the group consisting of alkylaluminoxanes, ionic activators and mixtures thereof.

In an embodiment of the invention the combination catalyst is a dual catalyst which is made by a method comprising the following sequence of steps:
i) calcining an inorganic oxide selected from the group consisting of $SiO_2$, $Al_2O_3$, MgO, $AlPO_4$, $TiO_2$, $ZrO_2$ and mixtures thereof;
ii) adding a silyl chromate to the inorganic oxide;
iii) adding an organoaluminum co-catalyst to the inorganic oxide;
iv) adding an activator to the inorganic oxide, wherein the activator is selected from the group consisting of alkylaluminoxanes, ionic activators and mixtures thereof;
v) adding a group 4 single site catalyst to the inorganic oxide; wherein the group 4 single site catalyst has the formula:

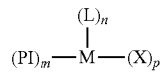

wherein, M is a group 4 metal; Pl is a phosphinimine ligand; L is a cyclopentadienyl type ligand; X is an activatable ligand; m is 1; n is 1; and p is an integer and the sum of m+n+p equals the valence state of M.

In a preferred embodiment of the invention, the combination catalyst will provide a polymer composition comprising a first polymer component produced by an inorganic chromium catalyst and a second polymer component produced by a group 4 single site catalyst. The first and second polymer components may be of similar or different weight average molecular weights and have similar or different comonomer contents.

In an embodiment of the present invention, the inorganic chromium catalyst and the group 4 single site catalyst will produce polymer components having different concentrations of comonomer (i.e. the first and second polymer components will have different comonomer content). Comonomer concentration or "comonomer content" is typically reported as mol % or as weight %. Either mol % or weight % can be used in the present invention to represent comonomer content. The comonomer content in an ethylene/alpha-olefin copolymer or copolymer component can be obtained using FTIR methods or GPC-FTIR methods (for multicomponent polymers) as is well known to persons skilled in the art. For example, an FTIR measurement as per the ASTM D6645-01 can be used to obtain the short chain branch (SCB) frequency of an ethylene/alpha-olefin copolymer in branches per 1000 carbons, which can then be converted into a mol % or weight % number. Comonomer content can also be measured using $^{13}$C NMR techniques as discussed in Randall, Rev. Macromol. Chem. Phys., C29 (2&3), p 285; U.S. Pat. No. 5,292,845 and WO 2005/121239.

In an embodiment of the present invention, the inorganic chromium catalyst will produce a polymer component which has a lower comonomer content than a polymer component produced by the group 4 single site catalyst. Such polymer compositions can be made using a dual or mixed catalyst comprising an inorganic chromium catalyst and a group 4 single site catalyst having at least one phosphinimine ligand as is described in U.S. Pat. Appl. Nos 20100190936A1 and 20100190937A1 which are incorporated herein by reference. Depending on the relative weight average molecular weights ($M_w$) of the polymer components made by each of the inorganic chromium and the group 4 single site catalysts, a component may be designated a high molecular weight (HMW) component or a low molecular weight (LMW) component.

In an embodiment of the present invention, the inorganic chromium catalyst and the group 4 single site catalyst will produce polymer components with a different weight average molecular weight ($M_w$) (i.e. the first and second polymer components will have different weight average molecular weights). Polymer compositions in which the inorganic chromium catalyst and the group 4 single site catalyst produce polymer components with similar weight average molecular weights are also part of the current invention (i.e. the first and second polymer components have similar weight average molecular weights).

In an embodiment of the invention the inorganic chromium catalyst produces a relatively lower molecular weight (LMW) or relatively higher molecular weight (HMW) component of a polyethylene composition, while the group 4 single site catalyst produces a corresponding higher molecular weight (HMW) or lower molecular weight (LMW) component of a polyethylene composition.

Whether the inorganic chromium catalyst or the group 4 single site catalyst produces a polymer component of relatively higher or lower molecular weight may generally depend on the hydrogen concentration. If the single site catalyst is more sensitive to hydrogen than the inorganic chromium catalysts, which is generally (but need not always be) the case, then for certain catalyst combinations, sufficient levels of hydrogen may shift the molecular weight of the polymer component made by the single site catalyst to a value that is lower than the molecular weight of the polymer component made by the inorganic chromium catalyst.

In an embodiment of the invention the inorganic chromium catalyst produces the low molecular weight (LMW) component of a polymer composition, while the single site catalyst produces the high molecular weight of a polymer composition. To clarify, the first polymer component if made by the inorganic chromium catalyst will preferably have a lower weight average molecular weight, than the weight average molecular weight of the second polymer component if made by a single site catalyst.

In an embodiment of the invention, the inorganic chromium catalyst produces the high molecular weight (HMW) component of a polymer composition, while the single site catalyst produces the low molecular weight component of a polymer composition. To clarify, the first polymer component if made by the inorganic chromium catalyst will preferably have a higher weight average molecular weight, than the weight average molecular weight of the second polymer component if made by a single site catalyst.

The LMW component of the polymer made with the current invention may have a weight average molecular weight ($M_w$), as measured by Gel Permeation Chromatography (GPC), of from 10,000 to 500,000 g/mole. In further embodiments of the invention the LMW component may have a Mw of from 25,000 to 400,000, or from 25,000 to 350,000, or from 50,000 to 300,000, or from 100,000 to 250,000. The HMW component of the polymer made with the current invention may have a weight average molecular weight ($M_w$), as measured by Gel Permeation Chromatography (GPC), of from 50,000 to 750,000. In further embodiments of the invention the HMW component may have a Mw of from 100,000 to 750,000, or from 125,000 to 500,000, or from 125,000 to 425,000, or from 150,000 to 400,000, or from 175,000 to 350,000.

The component of the polymer composition arising from the inorganic chromium catalyst may have a molecular weight distribution (Mw/Mn) of from about 8 to about 30.

The component of the polymer composition arising from the single site catalyst may have a molecular weight distribution (Mw/Mn) of from about 1.5 to about 6.0

In an embodiment of the process according to the current invention, the weight average molecular weight of the high molecular weight component ($M_w$-HMW) has an average molecular weight which is less than 200% higher than the weight average molecular weight of the low molecular weight component ($M_w$-LMW). In further embodiments of the invention, the $M_w$-HMW may be less than 150% higher, or less than 100% higher, or less than 75% higher, or less than 50% higher than the $M_w$-LMW.

In an embodiment of the invention, the first polymer component, which is made with an inorganic chromium catalyst, will have both a lower weight average molecular weight and a lower comonomer content than the second polymer component made with a single site catalyst. Such a polymer composition can be made using a dual or mixed catalyst comprising an inorganic chromium catalyst and a single site catalyst as is described in U.S. Pat. Appl. Nos 20100190936A1 and 20100190937A1 which are incorporated herein by reference. It is well known in the art that comonomer content can be determined using $^{13}$C NMR techniques, FTIR branching analysis, combined GPC-FTIR methods or by determination of the resin density.

The polyethylene composition of the present invention may be a copolymer of ethylene with an alpha olefin. Suitable alpha olefins are well known in the art and may be selected from 1-butene, 4-methyl-1-pentene, 1-hexene, 1-octene and the like with 1-hexene being preferred.

The molecular weight distribution of the overall polymer composition may be unimodal, broad and unimodal, bimodal or multimodal, and may or may not include peaks and shoulders and may or may not show peaks which are or are not fully resolved when the molecular weight distribution of the polymer composition is examined by gel permeation chromatography (GPC). The molecular weight distribution of the polymer composition made during use of the present invention may or may not have resolved high and low molecular weight peaks in a GPC chromatograph.

In the present invention, the individual polymer components may themselves be unimodal, broad and unimodal, bimodal, or multimodal, and may or may not include peaks and shoulders and may or may not show peaks which are or are not fully resolved when the molecular weight distribution of the polymer composition is examined by gel permeation chromatography.

In an embodiment of the invention, the polymer composition molecular weight distribution is bimodal at all times and the relative amounts of the high and low molecular weight modes (or components) change, when the level of scavenger is adjusted or changed.

In an embodiment of the invention, the combination catalyst and process of the current invention produces a polymer composition having reversed or partially reversed comonomer distributions. The phrase "reversed comonomer distribution" or "partially reversed comonomer distribution" means that on deconvolution of GPC-FTIR (or temperature raising elution fractionation, TREF) data (profiles) (typically using molecular weight distribution segments of not less than 10,000) there is one or more higher molecular weight components having a higher comonomer incorporation than in one or more lower molecular weight segments. If the comonomer incorporation rises with molecular weight, the distribution is described as "reversed". Where the comonomer incorporation rises with increasing molecular weight and then declines, the comonomer distribution is described as "partially reversed".

In embodiments of the invention the polymer composition will have a low, medium or high density (d in g/cc) and which generally falls in the range of from 0.890 to 0.960 g/cc. In a particular embodiment of the invention, the polymer composition will have a high density in the range of from 0.940 to 0.960 g/cc, preferably from 0.947 to 0.955 g/cc, making it suitable for use in high density pipe applications.

In an embodiment of the invention, the polyethylene composition is a high density resin with a density of from 0.941 to 0.953 g/cc.

In an embodiment of the invention, the comonomer content within the polyethylene composition will be in the range of less than 2.5 weight percent (wt %), or less than 1 wt %.

In embodiments of the invention, the weight average molecular weight (Mw) of the polyethylene composition will be from 150,000 to 500,000, preferably from 200,000 to 350,000.

In embodiments of the invention, the molecular weight distribution, $M_w/M_n$ of the polyethylene composition will be from about 8 to about 45, or from about 12 to 35, or from 12 to 30, or from 12 to 25.

In an embodiment of the invention, the polymer composition will have a high load melt index, $I_{21}$ in the range of from 1 to 100 g/10 min. In further embodiments of the invention the polymer composition will have an $I_{21}$ in the range of from 1 to 50 or from 1 to 20 or from 1 to 15 or from 1 to 10 or from 3 to 10 g/10 min.

In embodiments of the invention, the high load index, $I_{21}$ of the polyethylene composition can range from about 1 to about 20 g/10 min. Preferably, the $I_{21}$ will be in the range of about 2 to about 15 g/10 min.

In embodiments of the invention, the melt index, $I_2$ of the polyethylene composition is less than about 1 g/10 min, or less than about 0.2 g/10 min.

In an embodiment of the invention, the melt index, $I_5$ for the polyethylene composition is less than about 1 g/10 min.

In embodiments of the invention, the melt index, $I_5$ for the polyethylene composition is from 0.025 to 1 g/10 min, or from 0.05 to 0.75 g/10 min, or from 0.05 to 0.5 g/10 min.

In an embodiment of the invention, the melt flow ratio (MFR) which is defined as the high load melt index, $I_{21}$ divided by the melt index, $I_5$ will be at least 15 for the polymer composition. In further embodiments of the invention, the melt flow ratio (MFR) which is defined as the high load melt index, $I_{21}$ divided by the melt index, $I_5$ will be from 15 to 50, or from 15 to 45 for the polymer composition.

In an embodiment of the invention the polymer composition will have a reversed comonomer incorporation.

In an embodiment of the invention, the polyethylene composition is suitable for application in the manufacture of pipe. In an aspect of the current invention the polyethylene composition will have a PENT value at 2.4 Mpa of greater than 700 hrs. In another aspect of the invention, the polyethylene composition will have a PENT value at 3.0 MPa of greater than 700 hrs. In yet another aspect of the invention, the polyethylene composition will have a PENT value at 3.0 Mpa of greater than 1000 hrs. In yet another aspect of the invention, the polyethylene composition will have a PENT value at 3.0 Mpa of greater than 2000 hrs. In yet another aspect of the invention, the polyethylene composition will have a PENT value at 3.0 Mpa of greater than 5000 hrs. In yet another aspect of the invention, the polyethylene composition will have a PENT value at 3.0 Mpa of greater than 10,000 hrs. In yet another aspect of the invention, the polyethylene composition will have a PENT value at 3.0 Mpa of greater from 15,000 hrs.

In embodiments of the invention, the melt strength of the polyethylene composition is more than about 20 cN, preferably more than about 25 cN. In further embodiments of the invention, the polymer composition will have a melt strength of from 20 to 40 cN, or from 20 to 35 cN, or from 25 to 40 cN.

In order to control the ratio of first polymer component to second polymer component and hence the polymer composition made with the process of the current invention, the polymerization process is carried out in a reactor system in the presence of a combination catalyst, a catalyst poison and a scavenger.

In embodiments of the invention, the molar ratio of scavenger to catalyst poison (i.e. scavenger:poison) or impurity is from 0.01:1 to 10,000:1, including narrower ranges within this range.

The total amount of catalyst poison or impurity present in a reactor need not be known, but it should be sufficient to negatively affect the activity of at least one catalyst component of the combination catalyst toward olefin polymerization.

The total amount of catalyst poison or impurity present in or added to a reactor is not specified, but by way of a non-limiting example, it should be sufficient to negatively affect the activity of at least one catalyst component of the combination catalyst toward olefin polymerization. In an embodiment of the invention, the total amount of catalyst poison will be in the range of from about 0.001 ppm to about 500 molar ppm (the term "molar ppm" refers the parts per million in moles of catalyst poison, such as for example oxygen, present in a reactor zone, based on the total moles of gases present in a reactor zone; alternatively, the term "volume ppm" refers the parts per million in the volume of catalyst poison, such as for example oxygen, present in a reactor zone, based on the total volume of gases present in a reactor zone. Molar ppm and volume ppm are equivalent under assumed ideal gas conditions.).

In an embodiment of the invention, the polymer composition is made in a reactor system in the presence of a combination catalyst and from 0.001 to 500 molar ppm of a catalyst poison. In another aspect of the invention the process is carried out in the presence of from 0.01 to 500 molar ppm of catalyst poison. In another aspect of the invention the process is carried out in the presence of from 0.01 to 250 molar ppm of catalyst poison. In another aspect of the invention the process is carried out in the presence of from 0.01 to 100 molar ppm of catalyst poison. In another aspect of the invention the process is carried out in the presence of from 0.01 to 50 molar ppm of catalyst poison. In another aspect of the invention the process is carried out in the presence of from 0.01 to 25 molar ppm of catalyst poison. In another aspect of the invention the process is carried out in the presence of from 0.01 to 10 molar ppm of catalyst poison. In another aspect of the invention the process is carried out in the presence of from 0.01 to 5 molar ppm of catalyst poison.

In an embodiment of the invention the amount of catalyst poison or impurity present in a reactor is deliberately changed by an amount of from 0.1 ppm to 100 molar ppm including all numbers within this range (where ppm refers the parts per million in moles of catalyst poison, such as for example oxygen, present in a reactor zone, based on the total moles of gases present in a reactor zone).

The total amount of scavenger present in a reactor is not specified, but by way of a non-limiting example, it should be sufficient so that an increase in the level of scavenger positively affects the activity of at least one catalyst component of the combination catalyst toward olefin polymerization and where a decrease in the amount of scavenger negatively affects the activity of at least one catalyst component of the combination catalyst toward olefin polymerization.

In an embodiment of the invention, the amount of scavenger present in the reactor may be in the range of from about 0 ppm to about 10,000 ppm (where ppm is parts per million relative to the weight of polymer produced).

In an embodiment of the invention the amount of scavenger present in a reactor is deliberately changed by an amount of from 0.1 ppm to 10,000 ppm (where ppm is parts per million relative to the weight of polymer produced), including all numbers within this range.

In an embodiment of the invention the amount of scavenger present in a reactor is increased by an amount of from 0.1 ppm to 10,000 ppm (where ppm is parts per million relative to the weight of polymer produced), including all numbers within this range.

In an embodiment of the invention the amount of scavenger present in a reactor is decreased by an amount of from 0.1 ppm to 10,000 ppm (where ppm is parts per million relative to the weight of polymer produced), including all numbers within this range.

The actual amount of scavenger required to control the ratio of high to low molecular weight components may depend mainly on the sensitivity of the single site catalyst to catalyst poisons. If the single site catalyst has a low sensitivity to catalyst poisons, then lower amounts of scavenger may be required to change the activity of the single site catalyst. Conversely, a single site catalyst which has high sensitivity to catalyst poison may require higher amounts of scavenger to increase its polymerization activity.

In the present invention, the ratio of the first polymer component to the second polymer component may be represented as weight percent (wt %) ratio, which is based on the weight of each component over the sum of the weights of the first and second polymer components or the entire weight of the polymer composition. The weight ratios for first and second polymer components may be estimated by deconvolution of a GPC curve obtained for the polymer composition. Methods of polymer deconvolution are well known to persons skilled in the art; see for example Computer Applications in Applied Polymer Science, ACS Symposium Series, 1982, v197, Broyer, E. and Abbott, R., p 45-64. Flory's most probable distribution is often the method of choice to represent the molecular weight distribution (MWD) of polymers or polymer components. Polymers or polymer components with broad MWD can be represented by the sum of multiple Flory distributions. Generally, a deconvolution procedure may require the optimization of the Flory distribution parameter using a least-square objective function minimization, where the least-square function is the difference between the sample molecular weight distribution obtained by GPC analysis and the sum of the Flory distributions. The deconvolution process can be further improved using experimental knowledge about the catalyst system, which can be used to further constrain the solution of the objective function minimization. Once a multicomponent polymer composition has been deconvoluted, the weight fraction of polymer produced by each catalyst in a combination catalyst may be estimated by integrating the molecular weight distributions representing those polymer components made by each catalyst in the combination catalyst.

In the polymer composition made by the process of the current invention the first polymer component represents from 99 to 1 weight percent of the polymer composition and the second polymer component represents from 1 to 99 weight percent of the polymer composition based on the total weight of polymer composition. In another embodiment of the invention, the first polymer component represents from 95 to 25 weight percent of the polymer composition and the second polymer component represents from 5 to 75 weight percent of the polymer composition. In another embodiment on the invention, the first polymer component represent from 90 to 50 weight percent of the polymer composition and the second polymer component represents from 10 to 50 weight percent of polymer composition. In yet another embodiment of the invention, the first polymer component represents from 90 to 65 weight percent of the polymer composition and the second polymer component represents from 10 to 35 weight percent of the polymer composition. In still another embodiment of the invention, the first polymer component represents from 95 to 75 weight percent of the polymer composition and the second polymer component represents from 5 to 25 weight percent of the polymer composition. In still another embodiment of the invention, the first polymer component represents from 95 to 80 weight percent of the polymer composition and the second polymer component represents from 5 to 20 weight percent of the polymer composition. In still another embodiment of the invention, the first polymer component represents from 99 to 80 weight percent of the polymer composition and the second polymer component represents from 1 to 20 weight percent of the polymer composition. In still another embodiment of the invention, the first polymer component represents from 95 to 85 weight percent of the polymer composition and the second polymer component represents from 5 to 15 weight percent of the polymer composition.

In an aspect of the invention, changing the level of scavenger in a polymerization zone in the presence of a catalyst poison will change the weight percent of the first or second polymer components in the polymer composition by at least 0.5%. In further aspects of the invention, changing the level of a scavenger in a polymerization zone in the presence of a catalyst poison will change the weight percent of the first and second polymer components in the polymer composition by at least 1%, or at least 5% or at least 10% or at least 20% or at least 25%.

An embodiment of the invention is a continuous process to copolymerize ethylene and a co-monomer using a dual catalyst to provide a polymer composition comprising a first polymer component and a second polymer component wherein the continuous process comprises: controlling the ratio of the first polymer component to the second polymer component by conducting the process in the presence of between 0.01 and 500 molar ppm of catalyst poison; wherein lowering the level of scavenger in ppm (where here, with respect to the scavenger, "ppm" refers to the weight of the scavenger relative to the weight of the polymer produced) from a first higher level to a second lower level, increases the ratio of a first polymer component to a second polymer component, and raising the level of scavenger in ppm from a first lower level to a second higher level, decreases the ratio of the first polymer component to the second polymer component; provided that the dual catalyst comprises: an inorganic chromium catalyst, a group 4 single site catalyst, one or more catalyst activators, and a support; and where the inorganic chromium catalyst provides the first polymer component and the group 4 single site catalyst provides the second polymer component.

An embodiment of the invention is a continuous process to copolymerize ethylene and a co-monomer using a dual catalyst to provide a polymer composition comprising a first polymer component and a second polymer component wherein the continuous process comprises: controlling the ratio of the first polymer component to the second polymer component by conducting the process in the presence of between 0.01 and 500 molar ppm of catalyst poison; wherein lowering the level of scavenger in ppm by at least 5 ppm (where here, with respect to the scavenger, "ppm" refers to the weight of the scavenger relative to the weight of the polymer produced), increases the ratio of a first polymer component to a second polymer component, and raising the level of scavenger in ppm by at least 5 ppm, decreases the ratio of the first polymer component to the second polymer component; provided that the dual catalyst comprises: an inorganic chromium catalyst, a group 4 single site catalyst, one or more catalyst activators, and a support; and where the inorganic chromium catalyst provides the first polymer component and the group 4 single site catalyst provides the second polymer component.

An embodiment of the invention is a continuous process to copolymerize ethylene and a co-monomer using a dual catalyst to provide a polymer composition comprising a first polymer component and a second polymer component wherein the continuous process comprises: controlling the ratio of the first polymer component to the second polymer component by conducting the process in the presence of between 0.01 and 500 molar ppm of catalyst poison; wherein lowering the level of scavenger in ppm by at least 10 ppm (where here, with respect to the scavenger, "ppm" refers to the weight of the scavenger relative to the weight of the polymer produced), increases the ratio of a first polymer component to a second polymer component, and raising the level of scavenger in ppm by at least 10 ppm, decreases the ratio of the first polymer component to the second polymer component; provided that the dual catalyst comprises: an inorganic chromium catalyst, a group 4 single site catalyst, one or more catalyst activators, and a support; and where the inorganic chromium catalyst provides the first polymer component and the group 4 single site catalyst provides the second polymer component.

An embodiment of the invention is a continuous process to copolymerize ethylene and a co-monomer using a dual catalyst to provide a polymer composition comprising a first polymer component and a second polymer component wherein the continuous process comprises: controlling the ratio of the first polymer component to the second polymer component by conducting the process in the presence of between 0.01 and 500 molar ppm of catalyst poison; wherein lowering the level of scavenger in ppm by at least 25 ppm (where here, with respect to the scavenger, "ppm" refers to the weight of the scavenger relative to the weight of the polymer produced), increases the ratio of a first polymer component to a second polymer component, and raising the level of scavenger in ppm by at least 25 ppm, decreases the ratio of the first polymer component to the second polymer component; provided that the dual catalyst comprises: an inorganic chromium catalyst, a group 4 single site catalyst, one or more catalyst activators, and a support; and where the inorganic chromium catalyst provides the first polymer component and the group 4 single site catalyst provides the second polymer component.

An embodiment of the invention is a continuous process to copolymerize ethylene and a co-monomer using a dual catalyst to provide a polymer composition comprising a first polymer component and a second polymer component wherein the continuous process comprises: controlling the ratio of the first polymer component to the second polymer component by conducting the process in the presence of between 0.01 and 500 molar ppm of catalyst poison; wherein lowering the level of scavenger in ppm by at least 100 ppm (where here, with respect to the scavenger, "ppm" refers to the weight of the scavenger relative to the weight of the polymer produced), increases the ratio of a first polymer component to a second polymer component, and raising the level of scavenger in ppm by at least 100 ppm, decreases the ratio of the first polymer component to the second polymer component; provided that the dual catalyst comprises: an inorganic chromium catalyst, a group 4 single site catalyst, one or more catalyst activators, and a support; and where the inorganic chromium catalyst provides the first polymer component and the group 4 single site catalyst provides the second polymer component.

The process of the current invention can be a batch polymerization process or a continuous polymerization process both of which are well understood by persons skilled in the art.

Typically, a batch polymerization process will involve adding a combination catalyst, monomer and comonomer as well as any diluents or other reagents such as scavengers, once to a polymerization reactor. The polymerization reaction is typically initiated by injecting the combination catalyst into the reactor in the presence of polymerizable monomers. In a batch process, polymer is usually isolated after the reaction has been quenched with a suitable quenching agent. When using a batch process for the current invention, scavenger may be added once, before or after the polymerization reaction starts. Scavenger may also be added several times to obtain a desired concentration in the reactor.

In an embodiment of the invention, the process is a continuous polymerization process. Typically, a continuous polymerization process will involve continuous feeding of catalyst, monomer, diluents, scavengers, and the like to continuously produce polymer. In an embodiment of the present invention, scavenger is continuously fed to a continuous polymerization reactor or reaction zone in addition to monomer, optional comonomers and a combination catalyst. In a continuous process the ratio of scavenger to combination catalyst being fed to the reactor can be increased or decreased. Alternatively, the flow of combination catalyst to the reactor may be kept approximately constant while the ratio of scavenger to some other process parameter (such as for example the polymer production rate) is increased or decreased. Either way, the ratio of scavenger to combination catalyst present in the reactor is changed. Polymer is removed from the reactor in a continuous or periodic manner. Continuous reactor processes are well known by persons skilled in the art and include, solution, slurry and gas phase processes.

In an embodiment, the present invention employs a slurry phase process or a gas phase process, especially a continuous gas phase process.

In an embodiment, the present invention employs a gas phase process, especially a continuous gas phase process carried out in a single gas phase reactor.

In the current invention, the amount of scavenger present can be pre-determined, or changed in situ.

For a continuous process in which the combination catalyst is continuously added to a reactor system, the scavenger can be continuously added in constant or varying amounts, or intermittently added in constant or varying amounts.

In an embodiment of the invention, the level of scavenger is changed during the polymerization process (i.e. is altered in situ) to alter the polymer composition. In another embodiment of the invention, the level of scavenger used in the presence of the combination catalyst is determined before or after a polymerization run is started or finished respectively. In another embodiment of the invention, the scavenger is present during catalyst kills or catalyst transitions.

In an embodiment of the invention, the amount of scavenger will be increased to increase the activity of the single site catalyst, which correspondingly decreases the relative amount of low molecular weight component in the polymer composition. In another embodiment of the invention, the amount of scavenger is decreased to decrease the activity of the single site catalyst, which correspondingly decreases the relative amount of high molecular weight component in the polymer composition.

In an embodiment of the invention, the amount of scavenger will be increased to increase the activity of the single site catalyst, which correspondingly increases the relative amount of low molecular weight component in the polymer composition. In another embodiment of the invention, the amount of scavenger will be decreased to decrease the activity of the single site catalyst, which correspondingly increases the relative amount of high molecular weight component in the polymer composition.

In an embodiment of the invention, the amount of scavenger will be increased to increase the activity of the single site catalyst, which correspondingly increases the relative amount of a polymer component which has a relatively higher comonomer content in the polymer composition. In another embodiment of the invention, the amount of scavenger will be decreased to decrease the activity of the single site catalyst, which correspondingly decreases the relative amount of a polymer component having a relatively higher comonomer content in the polymer composition.

In an embodiment of the invention, the amount of scavenger will be increased to increase the activity of the single site catalyst, which correspondingly increases the relative amount of a polymer component which has a relatively higher molecular weight and comonomer content in the polymer composition. In another embodiment of the invention, the amount of scavenger will be decreased to decrease the activity of the single site catalyst, which correspondingly decreases the relative amount of a polymer component having a relatively higher molecular weight and comonomer content in the polymer composition.

In an embodiment of the invention, the process is a continuous polymerization process, and the amount of scavenger present relative to the amount of combination catalyst present can be increased or decreased over time. The level of scavenger present relative to the amount of combination catalyst present is adjusted by controlling the feed rate of scavenger and the feed rate of the combination catalyst to a continuous reactor or polymerization zone. More specifically, the feed ratio of scavenger to combination catalyst or to some other process parameter is adjusted. For a continuous polymerization process, the combination catalyst and scavenger are fed to a reactor zone in a continuous manner. Preferably they are fed separately. The feed rates of the combination catalyst and the scavenger can be monitored and adjusted. For example, the feed rate of the combination catalyst may be kept approximately constant while the feed rate of scavenger is increased or decreased. The polymerization zone of the present invention may represent a single reactor, or the reaction zone may represent a reactor which is part of a larger reactor system comprising further polymerization zones and reactors.

The use of scavenger as described in the present invention, can be used to maintain a consistent polymer product or it may be used to obtain a desired polymer composition by "fine-tuning" a dual catalyst having a fixed ratio of inorganic chromium and single site catalysts so that the desired amounts of high and low molecular weight components are formed.

It will be recognized by persons skilled in the art, that changing the ratio of high to low molecular weight components in the polymer composition, by the use of scavenger provides a means to control or adjust the high load melt index $I_{21}$ of the polymer composition. If the $I_{21}$ of the polymer being produced is not on target, then the amounts of scavenger present may be increased or decreased to change the $I_{21}$ accordingly. For processes in which the group 4 single site catalyst produces a polymer component with higher molecular weight than the inorganic chromium catalyst and when $I_{21}$ is lower than desired, a decrease in the amount of scavenger present will increase the $I_{21}$ (i.e. by decreasing the weight % of the HMW component); alternatively, if the $I_{21}$ of the polymer composition is higher than desired, an increase in the amount of scavenger present will decrease the $I_{21}$ (i.e. by increasing the weight % of the HMW component). If the inorganic chromium catalyst makes a polymer component having a higher molecular weight than the single site catalyst, then the above conditions will be reversed.

In an embodiment of the invention, the process of the current invention can be used to compensate for fluctuations in the polymerization conditions (e.g. hydrogen concentration, temperature, pressure, comonomer concentration, impurities level, etc.) which may themselves change the $I_{21}$ of the polymer composition, in order to produce polymer compositions with constant performance characteristics. Preferably, the presence of scavenger will affect the ratio of first to second polymer components without affecting the molecular weight performance of each catalyst species of a dual catalyst.

The present invention may be carried out in the following manner: the polymer composition is sampled and analyzed using rheological methods (e.g. melt index measurements, etc.) which are well known in the art; if the polymer composition does not have the desired rheological properties the feed ratio of the combination catalyst to scavenger is adjusted to change the ratio of first and second polymer components (such as for example, high to low molecular weight components); the polymer composition is again sampled and analyzed using rheological methods to determine whether the polymer composition has the targeted properties, and where not, the sequence of adjustment and testing is repeated until the desired properties are achieved. Other non-rheological methods, well known in the art, such as DSC (differential scanning calorimetry), TREF (temperature rising elution fractionation), GPC (gel permeation chromatography), GPC-TREF, GPC-FTIR (gel permeation chromatography with Fourier transform infrared detection) etc., can also be used to determine whether the polymer composition has the desired or targeted properties.

In an embodiment of the invention, controlling the relative amounts of first and second polymer components in accordance with the current invention may also be part of a more complex polymer composition regulation protocol. By way of non-limiting example, controlling the ratio of high molecular weight to low molecular weight components by conducting the polymerization in the presence of a dual catalyst, a catalyst poison and a scavenger may additionally comprise the following: i) measuring the ratio of first to second polymer components in the polymer composition or measuring the high load melt index $I_{21}$ of the polymer composition, ii) calculating the amount of scavenger necessary to achieve a prescribed ratio of first to second polymer components or polymer composition high load melt index $I_{21}$, and iii) increasing or decreasing the amount of scavenger present to produce a polymer composition with the desired high load melt index $I_{21}$.

In an embodiment of the invention, the level of scavenger is increased by an amount sufficient to decrease the high load melt index $I_{21}$ of the polymer composition by at least 0.1%. In an embodiment of the invention, the level of scavenger is decreased by an amount sufficient to increase the high load melt index $I_{21}$ of the polymer composition by at least 0.1%.

Suitable monomers which can be polymerized through the process of the current invention are ethylene for ethylene homopolymerization or ethylene and one or more alpha-olefins (also called "comonomers") for ethylene copolymerization. Ethylene copolymerization is preferred. Alpha-olefins include propylene, 1-butene, 1-pentene, 1-hexene, 1-heptene, 1-octene, 1-decene or other branched $C_2$-$C_{10}$ alpha olefins such as 4-methyl-1-pentene, conjugated and nonconjugated dienes such as 1,3-butadiene, 1,4-hexadiene or 1,7-octadiene or vinylaromatic compounds such as styrene or substituted styrene. Other alpha olefins include ones in which the double bond is part of a cyclic structure which can comprise one or more ring systems. Examples are cyclopentene, norbornene, tetracyclododecene or methylnorbornene or dienes such as 5-ethylidene-2-norbornene, norbornadiene or ethylnorbornadiene. In a preferred embodiment of the invention, ethylene is copolymerized with propene, 1-butene, 1-hexene and/or 1-octene.

The inventive method of polymerizing olefins can be carried out at temperatures in the range from 0 to 250° C., preferably from 25 to 150° C. and particularly preferably from 40 to 130° C., and under pressures of from 0.05 to 10 MPa, particularly preferably from 0.3 to 4 MPa, using all industrially known polymerization processes such as solution, slurry or gas phase processes. Preferably, the invention is carried out in the gas phase or the slurry phase. Optionally, a combination catalyst (e.g. a dual catalyst) can also be subjected to a prepolymerization before use in a gas phase or slurry phase process. The prepolymerization can be carried out in the gas phase, in suspension or in the monomer (bulk), and can be carried out continuously in a prepolymerization unit installed upstream of the polymerization reactor or in a discontinuous prepolymerization unit independent of the reactor operation.

Slurry polymerization is well known in the art. The polymerization is conducted in an inert diluent in which the resulting polymer is not soluble. The monomers may be soluble in the diluent. The diluent is typically a hydrocarbyl compound such as a $C_{5-12}$ hydrocarbon that may be un-substituted or substituted by a $C_{1-4}$ alkyl radical. Some potential diluents include pentane, hexane, heptane, octane, isobutene cyclohexane and methylcyclohexane. The diluent may be hydrogenated naphtha. The diluent may also be a $C_{8-12}$ aromatic hydrocarbon such as that sold by Exxon Chemical Company under the trademark ISOPAR® E. Typically, monomers are dispersed or dissolved in the diluent. The polymerization reaction takes place at temperatures from about 20° C. to about 120° C., preferably from about 40° C. to 100° C. The pressure in the reactor may be from about 15 psi to about 4,500 psi, preferably from about 100 to 1,500 psi. The reactors may be stirred tank or "loop" reactors with a settling leg to remove product polymer. The solids content of the suspension is generally in the range from 10 to 80%. The polymerization can be carried out either batch wise, e.g. in stirring autoclaves, or continuously, e.g. in tube reactors, preferably in loop reactors.

In gas phase polymerization, pressures can be in the range of 25 to 1000 psi, preferably 50 to 500 psi, most preferably 100 to 450 psi, and temperatures will be in the range of from 30 to 130° C., preferably 65 to 115° C. Stirred or preferably fluidized bed gas phase reactors can be used. In the gas phase fluidized bed polymerization of olefins, the polymerization is conducted in a fluidized bed reactor wherein a bed of polymer particles are maintained in a fluidized state by means of an ascending gas stream comprising the gaseous reaction monomer. The polymerization of olefins in a stirred bed reactor differs from polymerization in a gas fluidized bed reactor by the action of a mechanical stirrer within the reaction zone that contributes to fluidization of the bed. The gas phase polymerization may be conducted in dry mode, condensed mode or super condensed mode, all of which are well known in the art. Polymerization takes place in the presence of a non polymerizable gas that may be inert or may be an alkane, or a mixture thereof and typically hydrogen. For a detailed description of gas phase fluidized bed polymerization processes see U.S. Pat. Nos. 4,543,399; 4,588,790; 5,028,670; 5,352,749 and 5,405,922.

It is also possible to use a multizone reactor or a multi reactor system in which at least two polymerization zones or reactors are connected to one another and the polymer is passed alternately a number of times through these zones or reactors, and where each zone or reactor may have different polymerization conditions.

Such a multizone or multi reactor systems include multiple slurry reactors, the mixture of slurry and gas phase reactors or multiple gas phase in series or in parallel reactors. For examples of such reactors see WO 97/04015 and WO 00/02929. In preferred embodiment of the invention however, the polymerization process is carried out in a single reactor. The product is removed from the reactor by conventional means and separated from the diluent and/or residual monomers before further treatment.

In the current invention, the combination catalyst system may be fed to a polymerization reactor in a number of ways. For example, combination catalyst components may be fed to the reactor using one or more catalyst feeders. The combination catalyst or supported combination catalyst components may be fed to a reactor via a dry catalyst feeder or as a slurry in a hydrocarbon or other suitable viscous inert liquid such as but not limited to mineral oil. The catalyst slurry can be fed into the reactor using any suitable liquid delivery system, such as but not limited to a high pressure syringe pump or other displacement device.

In the current invention, scavenger or supported scavenger can be fed to a polymerization reactor in a number of ways. For example, a scavenger can be fed directly to the reactor as a separate feed or combined with another feed stream. For example, a supported scavenger may be fed to a reactor via a dry catalyst feeder or as a slurry in a hydrocarbon or other suitable viscous inert liquid such as but not limited to mineral oil. A supported scavenger can be fed into the reactor using any suitable liquid delivery system, such as but not limited to a high pressure syringe pump or other displacement device.

EXAMPLES

General Considerations: Melt indexes, $I_2$, $I_5$ and $I_{21}$ for the polyethylene compositions were measured according to ASTM D1238 (when conducted at 190° C., using a 2.16 kg, a 5.48 kg and a 21 kg weight respectively). Polyethylene composition density (g/cc) was measured according to ASTM D792. Molecular weight distribution ($M_w/M_n$) and molecular number and weight averages in g/mol (Mn, Mw, Mz) of resins were determined using high temperature Gel Permeation Chromatography (GPC) according to the ASTM D6474: "Standard Test Method for Determining Molecular Weight Distribution and Molecular Weight Averages of Polyolefins". The system was calibrated using the 17 polystyrene standards (Mw/Mn<1.1) in Mw range $5 \times 10^3$ to $8 \times 10^6$ and 2 hydrocarbon Standards $C_{40}$ and $C_{20}$. The operating conditions are listed below:

| | |
|---|---|
| GPC instrument: | Polymer Laboratories ® 220 equipped with a refractive index detector |
| Software: | Viscotek ® DM 400 Data Manager with PL Cirrus ® software |
| Columns: | 4 Shodex ® HT-800/S series cross-linked styrene-divinylbenzene with pore sizes $10^3$ Å, $10^4$ Å, $10^5$ Å, $10^6$ Å |
| Mobile Phase: | 1,2,4-trichlorobenzene |
| Temperature: | 140° C. |
| Flow Rate: | 1.0 ml/min |
| Sample Preparation: | Samples were dissolved in 1,2,4-trichlorobenzene by heating on a rotating wheel for four hours at 150° C. |
| Sample Filtration: | No |
| Sample Concentration: | 0.1% (w/v) |

The branch frequency of copolymer samples (i.e. the short chain branching, SCB per 1000 carbons) and the $C_6$ comonomer content (in wt % or mol %) was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

PENT is an abbreviation of the Pennsylvania Notch Test. The test measures the failure times of asymmetrically sharp-notched samples in a constant tensile load in a controlled condition as per ASTM 1473 "Standard Test Method for the Notched Tensile Test to Measure Slow Crack Growth Resistance of Polyethylene—PE Notch Test". The PENT values in hours are in general a measure of the slow crack growth of polyethylene (PE) resins or extruded solid wall pipe. The test is usually performed at 2.4 MPa and 80° C. per ASTM 1473 F1473-11. For accelerated testing of polymer compositions with very high slow crack growth resistance, the PENT test can be performed at an elevated stress level where failure is still brittle in nature. As an example, the test can be run at 3.0 MPa and 80° C., resulting in shorter failure times that could be approximately half as long as those measured at 2.4 MPa and the same temperature if the same brittle failure dominates the PENT test.

The melt strength of a polymer is measured on Rosand RH-7 capillary rheometer (barrel diameter=15 mm) with a flat die of 2-mm Diameter, L/D ratio 10:1 at 190° C. Pressure Transducer: 10,000 psi (68.95 MPa). Piston Speed: 5.33 mm/min. Haul-off Angle: 52°. Haul-off incremental speed: 50-80 m/min² or 65±15 m/min². Distance from the die exit to the pulley=41.5 cm. Constant surrounding air temperature=21°±2° C. A polymer melt is extruded through a capillary die under a constant rate and then the polymer strand is drawn at an increasing haul-off speed until it ruptures. The maximum steady value of the force in the plateau region of a force versus time curve is defined as the melt strength for the polymer.

Preparation of a Group 4 Single-Site Catalyst. Dichloro[(1,2,3,4,5-η)-1-(pentafluorophenyl)-2,4-cyclopentadien-1-yl] [P,P,P-tris(1,1-dimethylethyl)phosphine imidato-κN]titanium catalyst, $(Cp-C_6F_5)Ti(N=P^tBu_3)Cl_2$ was prepared as per Example 1 of Canadian Patent Application 2,605,077.

Preparation of an Inorganic Chromium Catalyst on an Inorganic Oxide Support (Al:Cr Molar Ratio of 6:1): Sylopol 955® silica, purchased from Grace Davison, was calcined by fluidizing with air at 200° C. for 2 hours and then under a flow of nitrogen at 600° C. for 6 hours. In a 2 L-three neck round bottom flask equipped with an overhead stirrer were added 100 g of the calcined silica, 3.24 g of silyl chromate (e.g. bis-triphenylsilyl chromate) and 800 mL of hexanes. The flask was covered with an Al foil and maintained at 45° C. for 2 hours while the slurry was stirred at 200 rpm. 15.65 g of a 25.5 wt % diethylaluminum ethoxide in heptane solution was added into the flask over a period of 8 to 9 minutes. The slurry was heated at 60° C. for 2 h30 min while maintaining stirring. Vacuum was then applied first at 30° C., then at 70° C. to remove the solvent until 850 mTorr was achieved, yielding light green, free-flowing powder with an Al/Cr molar ratio of 6/1.

Preparation of Combination Catalyst 1 (Al/Cr Molar Ratio of 6/1; Cr/Ti Molar Ratio 9.0/1.0). In a 1 L-three neck flask equipped with an overhead stirrer, 50 g of the silica supported inorganic chromium catalyst prepared immediately above was slurried in 243 g of hexanes. While the mixture was being stirred, 16.76 g of a 10 wt % MAO in toluene solution was slowly added into the flask at the ambient temperature. 0.150 g of the single site catalyst complex, $(Cp-C_6F_5)Ti(N=P^tBu_3)Cl_2$ was added into the flask as powder. The mixture was stirred at 50° C. for 2 h30 min. Vacuum was then applied first at 30° C., then at 70° C. to remove the solvent until 600 mTorr was achieved, yielding a free-flowing powdery catalyst.

Preparation of Combination Catalyst 2 (Al/Cr molar ratio of 8/1; Cr/Ti Molar Ratio 8.9/1) and Combination Catalyst 3 (Al/Cr Molar Ratio of 8/1; Cr/Ti Molar Ratio 7.5/1). These catalysts were prepared in a manner similar to the procedures given above except that the relative amounts of diethylaluminum ethoxide, bis-triphenylsilyl chromate, and single site catalyst complex $(Cp-C_6F_5)Ti(N=P^tBu_3)Cl_2$, were altered to give the catalyst compositions shown in Table 1.

Preparation of a Supported Triethylaluminum Scavenger: Sylopol 955 silica, purchased from Grace Davison, was calcined by fluidizing with air at 200° C. for 2 hours and then under a flow of nitrogen at 600° C. for 6 hours. In a 3 L-three neck round bottom flask equipped with an overhead stirrer, 250 g of the calcined silica was slurried in 1600 mL of hexanes. While the slurry was stirred at ambient temperature, 209.81 g of a 25 wt % $Et_3Al$ in hexane solution was added over 70 minutes. The mixture was further stirred for another hour at ambient temperature. Vacuum was then applied first at 30° C., then at 60° C. to remove the solvent until 400 mTorr was achieved, yielding a free-flowing white powder.

Polymerization

Continuous ethylene/1-hexene gas phase copolymerization experiments were conducted in a 56.4L Technical Scale Reactor (TSR) in continuous gas phase operation. Ethylene polymerizations were run at 80° C.-102° C. with a total operating pressure of 300 pounds per square inch gauge (psig). Gas phase compositions for ethylene and 1-hexene were controlled via closed-loop process control (using Proportional-Integral-Derivative controllers). Hydrogen was metered into the reactor in a molar feed ratio relative to ethylene feed during polymerization. Nitrogen constituted the remainder of the gas phase mixture. The polymerization run reaction times were from about 2.25 to about 2.75 hrs. The 1-hexene/ethylene (C6/C2) molar ratio for each polymerization run was maintained at 0.005:1. The hydrogen/ethylene (H2/C2) molar ratio for each polymerization run was maintained at 0.003:1. Relevant process data, including the level of scavenger used in each run, and details about the combination catalyst composition are provided in Table 1. Relevant polymer data is also included in Table 1 and in FIGS. 1, 2 and 3.

TABLE 1

| Comb. Cat. No. | Pol. Run. No. | Al/Cr (mol/mol)$^{NOTE\ 1}$ | Comb. Cat. Cr/Ti (mol/mol) | Supported AlEt$_3$ (ppm)$^{NOTE\ 2}$ | Productivity (g PE/ g cat)$^{NOTE\ 3}$ | Density (g/cc) | HLMI, I$_{21}$ (g/10 min) | PDI (M$_w$/M$_n$) |
|---|---|---|---|---|---|---|---|---|
| 1 | 1 | 6.0 | 9.0:1 | 266 | 2572 | 0.9493 | 11.20 | 16.72 |
|   | 2 | 6.0 | 9.0:1 | 608 | 2476 | 0.9426 | 2.37 | 18.06 |
| 2 | 3 | 8.0 | 8.9:1 | 0 | 1922 | 0.9508 | 15.50 | 25.4 |
|   | 4 | 8.0 | 8.9:1 | 127 | 1564 | 0.9476 | 7.65 | 17.41 |
|   | 5 | 8.0 | 8.9:1 | 304 | 2594 | 0.9416 | 1.81 | 23.74 |
| 3 | 6 | 8.0 | 7.5:1 | 72 | 1898 | 0.9507 | 10.70 | 17.88 |
|   | 7 | 8.0 | 7.5:1 | 82 | 2196 | 0.9476 | 5.78 | 20.18 |
|   | 8 | 8.0 | 7.5:1 | 199 | 2818 | 0.9408 | 1.44 | 16.22 |

NOTE 1

Considers only the Et$_2$AlOEt in the combination catalyst and not the MAO.

NOTE 2

The data given is the weight of triethylaluminum relative to weight of polymer produced in parts per million (ppm).

NOTE 3

The grams of polyethylene per gram of combination catalyst.

Polymerization run Nos 1 and 2, employing combination catalyst No. 1, were run back to back under analogous conditions except that the level of scavenger was changed. Polymerization run Nos 3, 4 and 5, employing combination catalyst No. 2, were run back to back under analogous conditions except that the level of scavenger was changed. Polymerization run Nos. 6, 7 and 8, employing combination catalyst No. 3, were run back to back under analogous conditions except that the level of scavenger was changed.

Figure 2:
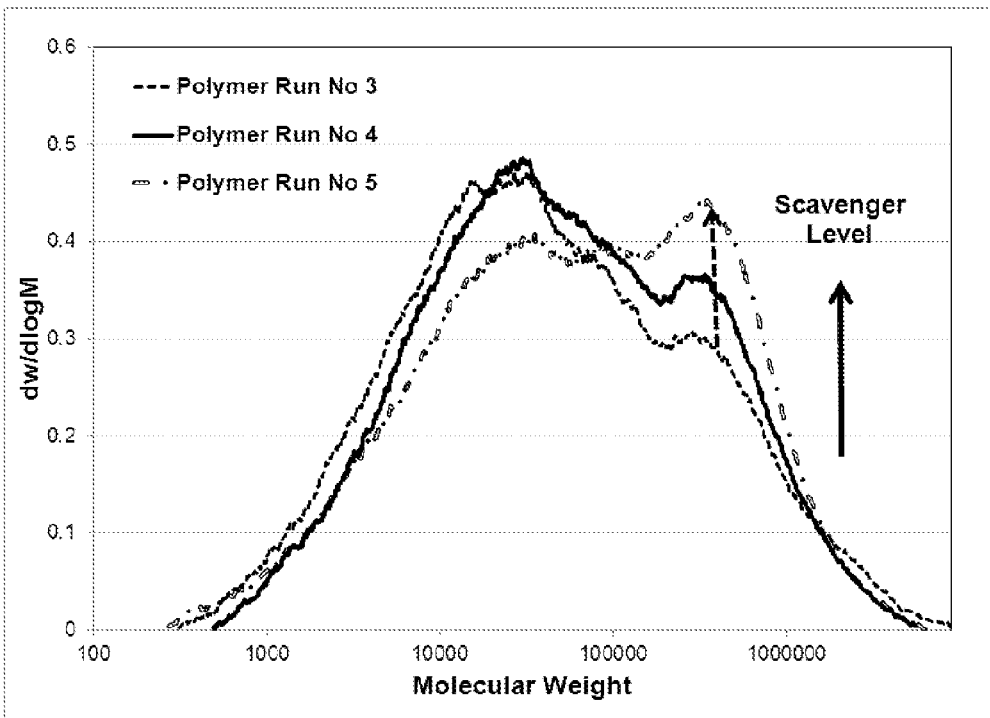
FIG. 2 shows how the polymer composition molecular weight distribution profile (from GPC) is affected by changes in the amount of scavenger present in a reactor for embodiments of the current invention.
Figure 3:
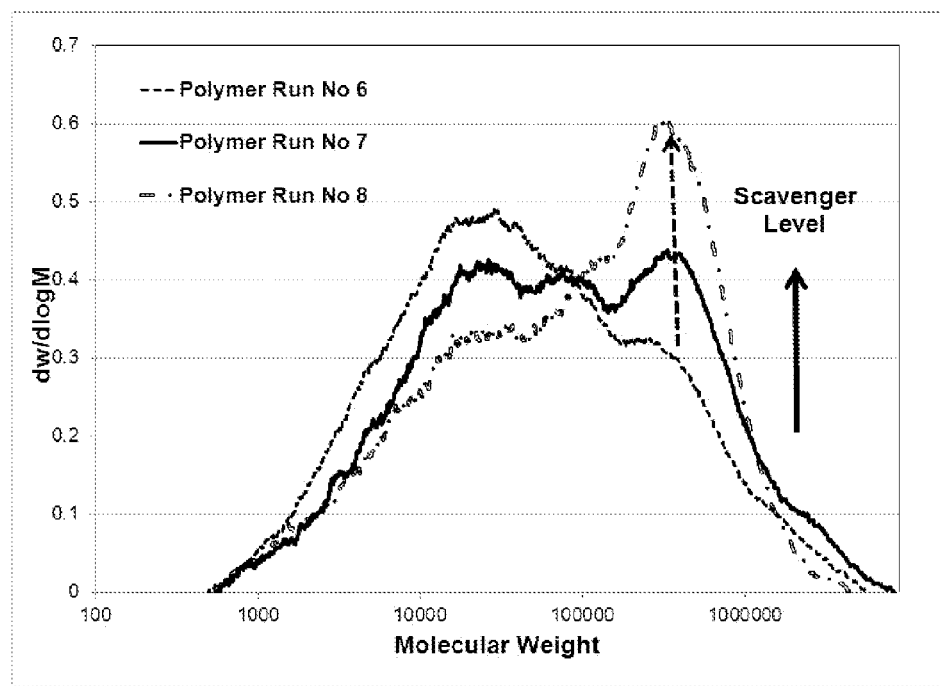
FIG. 3 shows how the polymer composition molecular weight distribution profile (from GPC) is affected by changes in the amount of scavenger present in a reactor for embodiments of the current invention.

As can be seen from the data provided in Table 1 and FIGS. 1-3 an increase in the flow of supported scavenger (triethylaluminum on a silica support) to the polymerization reactor, leads to a decrease in the polymer composition high load melt index, I$_{21}$. This is so, because, additional levels of scavenger remove impurities present in the reactor which preferential reduce the activity of the group 4 single site catalyst relative to the inorganic chromium catalyst. By increasing the relative activity of the group 4 singe site catalyst, the second polymer fraction, which in this case is a relatively higher molecular weight fraction, is increased. Conversely, a decrease in the flow of supported scavenger (triethylaluminum on a silica support) to the polymerization reactor, leads to an increase in the polymer composition high load melt index, I$_{21}$. This is so, because, decreased levels of scavenger leave higher levels of impurity present in the reactor, which preferential reduce the activity of the group 4 single site catalyst relative to the chromium catalyst. By decreasing the relative activity of the group 4 single site catalyst, the second polymer fraction, which in this case is a relatively higher molecular weight fraction, is decreased. Comparing polymerization run Nos 1-2, with polymerization run Nos 2-5, and with polymerization run Nos 6-8, shows that this effect is observed when different combination catalyst compositions are employed.

What is claimed is:

1. A process to co-polymerize ethylene and at least one co-monomer in the presence of at least one catalyst poison using a combination catalyst to provide a polymer composition comprising a first polymer component and a second polymer component wherein said process comprises:
    adjusting the ratio of said first polymer component to said second polymer component by altering the amount of scavenger present;
    wherein said combination catalyst comprises:
        an inorganic chromium catalyst,
        a group 4 single site catalyst,
        one or more activators;
        and a support;
    wherein said inorganic chromium catalyst provides said first polymer component and said group 4 single site catalyst provides said second polymer component;
    wherein said catalyst poison reduces the polymerization activity of said group 4 single site catalyst relative to said inorganic chromium catalyst; and
    wherein lowering the level of scavenger in ppm (weight of scavenger relative to the weight of polymer produced in parts per million) from a first higher level to a second lower level, increases said ratio of said first polymer component to said second polymer component, and raising the level of scavenger in ppm (weight of scavenger relative to the weight of polymer produced in parts per million) from a first lower level to a second higher level, decreases said ratio of said first polymer component to said second polymer component.

2. The process of claim 1 wherein said scavenger has the formula Al(R$^1$)$_n$(R$^2$)$_{3-n}$, where R$^1$ is a hydrocarbyl having from 1 to 20 carbon atoms; R$^2$ is independently selected from the group consisting of an alkoxide having from 1 to 20 carbon atoms, an aryloxide having from 6 to 20 carbon atoms, a halide, and a hydride; and n is a number from 1 to 3.

3. The process of claim 1 wherein said scavenger is supported.

4. The process of claim 3 wherein said scavenger is supported on an inorganic oxide.

5. The process of claim 1 or claim 3 wherein said scavenger is triethylaluminum.

6. The process of claim 1 wherein said group 4 single site catalyst has at least one phosphinimine ligand.

7. The process of claim 6 wherein said group 4 single site catalyst has the formula:

L(PI)MX$_2$ where L is a cyclopentadienyl type ligand, PI is a phosphinimine ligand, M is Ti, Zr or Hf, and each X independently, is an activatable ligand.

8. The process of claim 1 wherein said inorganic chromium catalyst is a silyl chromate catalyst.

9. The process of claim 1 wherein said combination catalyst is a dual catalyst.

10. The process of claim 9 wherein said dual catalyst is supported on an inorganic oxide.

11. The process of claim 10, wherein said dual catalyst system comprises:
a) a silyl chromate catalyst; and
b) a group 4 single site catalyst having the formula:

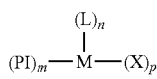

wherein, M is a group 4 metal; PI is a phosphinimine ligand; L is a cyclopentadienyl type ligand; X is an activatable ligand; m is 1 or 2; n is 0 or 1; and p is an integer and the sum of m+n+p equals the valence state of M; and
c) one or more activators;
wherein, the molar ratio of Cr to group 4 metal in said dual catalyst is from 5:95 to 95:5.

12. The process of claim 11 wherein said dual catalyst is made by a method comprising the following sequence of steps:
i) calcining an inorganic oxide selected from the group consisting of $SiO_2$, $Al_2O_3$, MgO, $AlPO_4$, $TiO_2 ZrO_2$ and mixtures thereof;
ii) adding a silyl chromate to the inorganic oxide;
iii) adding an organoaluminum co-catalyst to the inorganic oxide;
iv) adding a mixture comprising a group 4 single site catalyst and an activator to the inorganic oxide; wherein the group 4 single site catalyst has the formula:

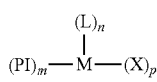

wherein, M is a group 4 metal; PI is a phosphinimine ligand; L is a cyclopentadienyl type ligand; X is an activatable ligand; m is 1; n is 1; and p is an integer and the sum of m+n+p equals the valence state of M; and wherein the activator is selected from the group consisting of alkylaluminoxanes, ionic activators and mixtures thereof.

13. The process of claim 11 wherein said dual catalyst is made by a method comprising the following sequence of steps:
i) calcining an inorganic oxide selected from the group consisting of $SiO_2$, $Al_2O_3$, MgO, $AlPO_4$, $TiO_2$ $ZrO_2$ and mixtures thereof;
ii) adding a silyl chromate to the inorganic oxide;
iii) adding an organoaluminum co-catalyst to the inorganic oxide;
iv) adding an activator to the inorganic oxide, wherein the activator is selected from the group consisting of alkylaluminoxanes, ionic activators and mixtures thereof;
v) adding a group 4 single site catalyst to the inorganic oxide; wherein the group 4 single site catalyst has the formula:

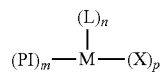

wherein, M is a group 4 metal; PI is a phosphinimine ligand; L is a cyclopentadienyl type ligand; X is an activatable ligand; m is 1; n is 1; and p is an integer and the sum of m+n+p equals the valence state of M.

14. The process of claim 1 wherein said comonomer is selected from the group consisting of 1-butene, 1-hexene and 1-octene.

15. The process of claim 1 wherein said process is a gas phase process.

16. The process of claim 1 wherein said first polymer component has a lower comonomer content than said second polymer component 17. The process of claim 1 or 16 wherein said first polymer component has a lower weight average molecular weight than said second polymer component.

18. The process of claim 1 wherein said polymer composition has a molecular weight distribution which is bimodal when analyzed by gel permeation chromatography.

19. The process of claim 1 wherein said first polymer component represents from 95 to 25 wt % of said polymer composition and said second polymer component represents from 5 to 75 wt % of said polymer composition.

20. The process of claim 1 wherein said first polymer component represents from 99 to 80 wt % of said polymer composition and said second polymer component represents from 1 to 20 wt % of said polymer composition.

21. The process of claim 19 or 20 wherein said polymer composition has a molecular weight distribution which is bimodal when analyzed by gel permeation chromatography.

22. The process of claim 19 or 20 wherein said polymer composition has a molecular weight distribution which is bimodal when analyzed by gel permeation chromatography and wherein said first polymer component has a lower weight average molecular weight than said second polymer component.

23. The process of claim 19 or 20 wherein said polymer composition has a molecular weight distribution which is bimodal when analyzed by gel permeation chromatography; and wherein said first polymer component has a lower weight average molecular weight than said second polymer component; and wherein said first polymer component has a lower comonomer content than said second polymer component.

24. The process of claim 1, further comprising changing an amount (in molar ppm) of carbon dioxide present.

25. A process to co-polymerize ethylene and at least one co-monomer in the presence of at least one catalyst poison using a combination catalyst to provide a polymer composition comprising a first polymer component and a second polymer component wherein said process comprises:
adjusting the ratio of said first polymer component to said second polymer component by altering the amount of scavenger present;
wherein said combination catalyst comprises:
an inorganic chromium catalyst,
a group 4 single site catalyst,
one or more activators;
and a support;
wherein said inorganic chromium catalyst provides said first polymer component and said group 4 single site catalyst provides said second polymer component;

wherein said catalyst poison reduces the polymerization activity of said group 4 single site catalyst relative to said inorganic chromium catalysts; and wherein decreasing the molar ratio of scavenger to catalyst poison, increases said ratio of said first polymer component to said second polymer component, and increasing the molar ratio of scavenger to catalyst poison decreases said ratio of said first polymer component to said second polymer component.

* * * * *